(12) United States Patent
Wharton et al.

(10) Patent No.: US 9,476,715 B2
(45) Date of Patent: Oct. 25, 2016

(54) NAVIGATIONAL ROUTE SELECTION TO MITIGATE PROBABILITY MOBILE TERMINAL LOSES COMMUNICATION CAPABILITY

(71) Applicant: Space Systems/Loral, LLC, Palo Alto, CA (US)

(72) Inventors: Anne E. Wharton, Boulder Creek, CA (US); William Hreha, San Jose, CA (US)

(73) Assignee: SPACE SYSTEMS/LORAL, LLC, Palo Alto, CA (US)

( * ) Notice: Subject to any disclaimer, the term of this patent is extended or adjusted under 35 U.S.C. 154(b) by 0 days.

(21) Appl. No.: 14/632,492

(22) Filed: Feb. 26, 2015

(65) Prior Publication Data

US 2016/0252350 A1    Sep. 1, 2016

(51) Int. Cl.
| | |
|---|---|
| G01C 21/00 | (2006.01) |
| H04W 4/02 | (2009.01) |
| G01C 21/20 | (2006.01) |
| G01S 19/13 | (2010.01) |

(52) U.S. Cl.
CPC ............. *G01C 21/00* (2013.01); *G01C 21/20* (2013.01); *G01S 19/13* (2013.01); *H04W 4/02* (2013.01)

(58) Field of Classification Search
CPC ....... G01C 21/00; G01C 21/20; G01S 19/13; H04W 4/02
See application file for complete search history.

(56) References Cited

U.S. PATENT DOCUMENTS

| | | | | |
|---|---|---|---|---|
| 6,721,572 | B1* | 4/2004 | Smith ................ | H04W 76/028 370/328 |
| 7,447,593 | B2* | 11/2008 | Estkowski ............ | G01C 21/20 700/250 |
| 7,941,108 | B2* | 5/2011 | Shaffer ................ | G01C 21/20 340/572.1 |
| 8,285,310 | B1* | 10/2012 | Shrum, Jr. ........... | H04W 48/18 370/338 |
| 2009/0005073 | A1* | 1/2009 | Shaffer .............. | G01C 21/3461 455/456.2 |
| 2010/0088025 | A1* | 4/2010 | Garg .................. | G01C 21/3461 701/533 |
| 2012/0253663 | A1 | 10/2012 | Hani et al. | |
| 2012/0271543 | A1 | 10/2012 | Boyer | |
| 2013/0013198 | A1 | 1/2013 | Adrain | |
| 2013/0321424 | A1* | 12/2013 | Pylappan .............. | G01C 21/20 345/440 |
| 2014/0257695 | A1* | 9/2014 | Annapureddy ........ | G01C 21/00 701/537 |

* cited by examiner

*Primary Examiner* — Nicholas Kiswanto
(74) *Attorney, Agent, or Firm* — Vierra Magen Marcus LLP

(57) ABSTRACT

Present location information about a present location of a mobile terminal is obtained, as is destination information about a target destination for the mobile terminal, wherein the target destination can be a waypoint destination or a final destination for the mobile terminal. Also obtained is wireless communication coverage information about wireless communication coverage associated with one or more geographic regions between the present location of the mobile terminal and the target destination for the mobile terminal. In dependence on the wireless communication coverage information, a navigational route is determined for the mobile terminal that mitigates a probability that the mobile terminal will lose a specific type of communication capability while travelling between the present location of the mobile terminal and the target destination for the mobile terminal.

22 Claims, 9 Drawing Sheets

NAVIGATIONAL ROUTE SELECTION TO MITIGATE PROBABILITY MOBILE TERMINAL LOSES COMMUNICATION CAPABILITY

BACKGROUND

1. Field

The present disclosure relates to technology for wireless communication systems, such as, but not limited to, satellite communication systems.

2. Description of the Related Art

A satellite communication system includes one or more satellites, one or more satellite terminals, hereafter sometimes simply called terminals, and one or more network nodes which may provide satellite network connectivity, system services, management, control, and/or external interface functions. A satellite terminal can, e.g., provide connectivity with one or more satellites in order to provide satellite system data, control and/or management plane services. Additionally, or alternatively, a satellite terminal may provide connectivity to other network nodes in the satellite communication system that supports these services. Satellite terminals may be ground-based, airborne, marine-based, or space-based. In some cases, the satellite terminal can be located on the satellite, but unless specified, is presumed to be remote from the satellite. A satellite communication system typically includes satellite terminals that can communicate with one another utilizing at least one of the satellites. The satellite terminals may also utilize zero, one or more satellites and zero, one or more other satellite terminals to wirelessly obtain access to other networks. For example, a satellite terminal may utilize a satellite and another satellite terminal (e.g., a gateway type of satellite terminal) to wirelessly connect to the Internet, and thereby, obtain any type of information that is readily available over the Internet.

A satellite communication system is typically assigned one or more specific radio frequency (RF) and/or optical bands that the satellite communication system is allowed to use to provide its communication capabilities to its satellite terminals. Other types of wireless communication systems, such as a ground-based communication system, are each assigned their own RF and/or optical bands, which are typically different than those used by a satellite communication system. This way, at least theoretically, a satellite communication system and another communication system will not interfere with one another. In other words, a satellite communication system should preferably not produce interference that adversely affects another communication system, and vice versa.

Interference can adversely affect a satellite communication system. Costs associated with interference mitigation and loss of revenue may exceed multiple millions of dollars per year for a satellite communication system. Such costs can include lost or reduced revenues due to delays of the start of services. Additionally, because of interference, transponders may be directed to operate in a backed off mode that results in less power and/or bandwidth available for use or sale.

There are various types of interference that may adversely affect a satellite communication system, such as, but not limited to, user error, cross-polarization leakage, adjacent satellites, terrestrial services and deliberate interference. User interference can result, e.g., from an operator error, equipment malfunction, poor cable shielding, and the like. Cross-polarization leakage, which can also be called cross-polarization interference, may be caused by incompatible modulation types (such as FM TV) transmitted in an opposite polarization field, poorly aligned antennas and/or inexperience of uplink operators. Adjacent satellite interference, which may be caused by operator error or poor inter-system coordination, has become more prevalent as smaller spacing between frequency bands assigned to different satellite communication systems becomes more common. Terrestrial interference may be caused by terrestrial microwave systems as well as by radar systems, but are not limited thereto. Deliberate interference can be caused by radio jamming equipment, or the like.

Over the relatively long term, interferers may be identified and then modified or shut down as appropriate, if possible. However, in the relatively short term, a satellite communication system may adapt to interference only after a satellite terminal of the satellite communication system has dropped a link or has informed a subsystem of the satellite communication system (which is responsible for dynamic resource allocation (DRA) and/or dynamic link adaption) of their poor link quality. In other words, a satellite communication system typically deals with interference in a reactive manner.

Mobile satellite terminals, which can also be referred to as mobile communication terminals or more succinctly as mobile terminals, often rely on a wireless communication system (e.g., a satellite and/or a ground-based communication system) to obtain navigational route information used for directing the mobile terminals from their present locations to target locations. Such mobile terminals can be, e.g., mobile telephones, mobile multi-media devices or navigational subsystems of manned, autonomous or semi-autonomous vehicles. A manned, autonomous, or semi-autonomous vehicle can be, for example, an aircraft, a car, a truck, a train, a bus or a boat. Where an autonomous or semi-autonomous vehicle is an aircraft, it can also be referred to as a drone. Many vehicles include a navigational subsystem that relies on global positioning system (GPS) satellites to track a present location of the vehicle, which is used by software to determine and provide directions to a human driver or to a computer that controls an autonomous or semi-autonomous vehicle. Some navigational subsystems allow a driver to select from among different routes that have different characteristics, such as, but not limited to, a shortest distance route, a shortest travel time route, a least amount of highway travel route, and a most amount of highway travel route. When following one of the routes specified by the navigational subsystem, a mobile terminal can potentially lose one or more communication capabilities. In other words, a mobile terminal may lose a communication capability while travelling between a present location of the mobile terminal and a target destination for the mobile terminal. Exemplary types of communication capabilities that may be lost, at least temporarily, include a GPS or other navigation capability, a control and/or status link, a voice telephony capability, and a multimedia communications capability. When a GPS navigation capability is lost, the user terminal may at least temporarily be unable to determine its location and/or provide directions. This may be frustrating to a driver that was following directions provided by the navigational subsystem type of mobile terminal. This may be catastrophic to an autonomous navigational subsystem type of mobile terminal.

Autonomous or semi-autonomous vehicles can utilize navigational subsystems to autonomously or semi-autonomously transport people and/or cargo from one location to another. Autonomous or semi-autonomous vehicles (e.g., drones) can alternatively utilize navigational subsystems to perform surveillance, e.g., in hostile territories. Alternatively, or additionally, autonomous or semi-autonomous vehicles can utilize navigational subsystems to carry a communication payload. For example, drones that carry a communication payload may be directed to fly over specific geographic regions at specific times to add communication capabilities to areas that would otherwise not be satisfactorily serviced, e.g., because of high traffic demands or communication dead zones. Another example of an autonomous or semi-autonomous vehicle is a rover that explores the moon or another planet, such as Mars.

DETAILED DESCRIPTION

In accordance with certain embodiments of the present technology, interference information is obtained from one or more interference information sources external to a particular satellite communication system, wherein the interference information is indicative of non-weather related interference that can adversely affect efficacy of the satellite communication system. Such embodiments also involve dynamically adapting configurable link parameters and/or dynamically allocating resources of the particular satellite communication system based on the interference information obtained from the one or more interference information sources that is/are external to the satellite communication system. Such dynamic link adaptation and/or dynamic allocating of resources can advantageously be performed proactively to prevent or mitigate adverse effects of non-weather related interference on the efficacy of the satellite communication system. Interference information is an exemplary type of situational awareness information. In certain embodiments, additional and/or alternative types of situational awareness information obtained from sources external to the satellite communication system is/are used to dynamically adapt configurable link parameters and/or dynamically allocate resources of the particular satellite communication system. Situational awareness information, obtained by the particular satellite communication system or sub-system(s) thereof, can also be used to dynamically adapt configurable link parameters and/or dynamically allocate resources of the particular satellite communication system.

Certain embodiments of the present technology are for use in directing a mobile terminal from a present location to a target location. Present location information about a present location of a mobile terminal is obtained, as is destination information about a target destination for the mobile terminal, wherein the target destination can be a waypoint destination or a final destination for the mobile terminal. Also obtained is wireless communication coverage information about wireless communication coverage associated with one or more geographic regions between the present location of the mobile terminal and the target destination for the mobile terminal. A navigational route is determined for the mobile terminal that mitigates a probability that the mobile terminal will lose a specific type of communication capability while travelling between the present location of the mobile terminal and the target destination for the mobile terminal. In accordance with certain embodiments, additional information, e.g., about military threat zones and/or physical hazards can also be used to determine the navigational route.

Figure 1:
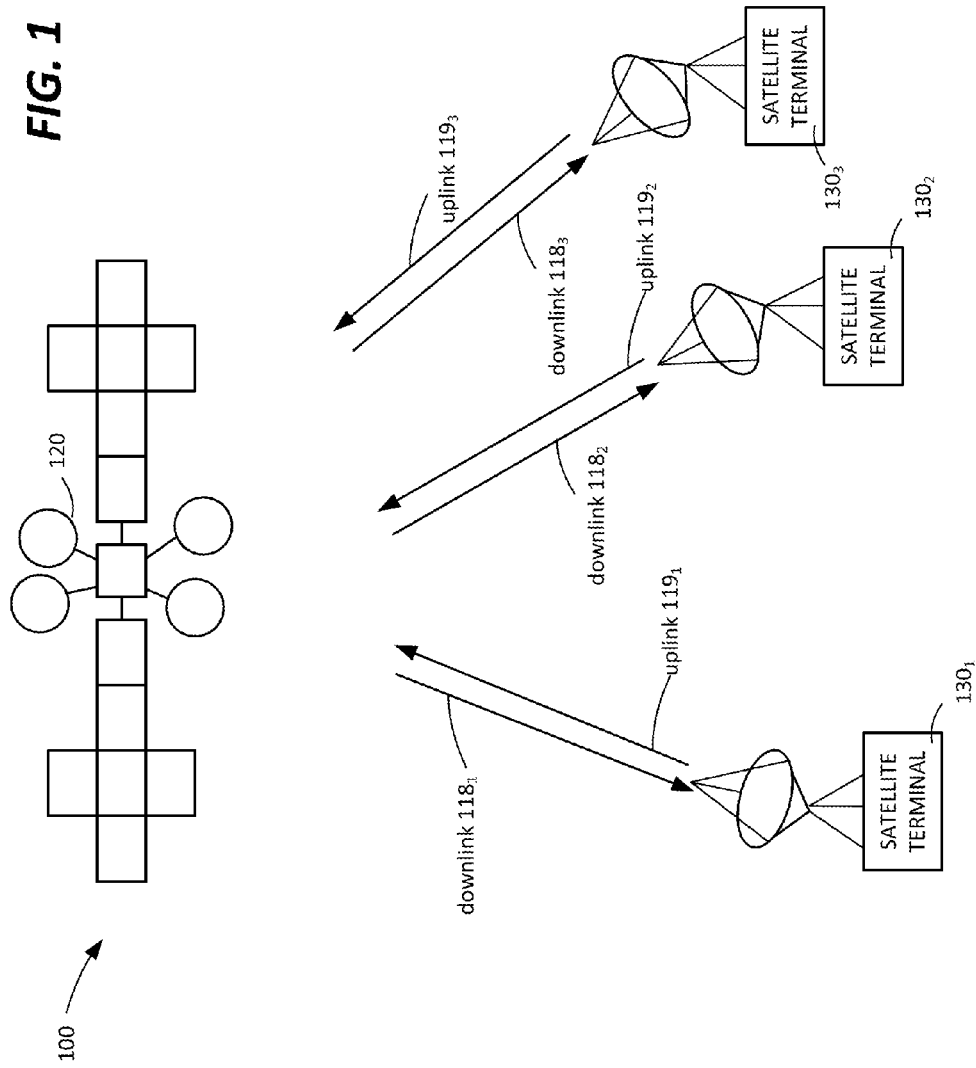
FIG. 1 is a high level block diagram used to describe one embodiment of a satellite communication system.

Before providing additional details of embodiments of the present technology, it is first useful to describe an exemplary wireless communication system within which such embodiments of the present technology can be implemented. FIG. 1 depicts a simplified diagram of a portion of an exemplary wireless communication system 100 in which embodiments of the presently disclosed technology may be practiced. In the example of FIG. 1, a communications platform according to one embodiment includes a satellite 120 forming part of the wireless communications system 100, which can also be referred to as a satellite communication system 100. Other embodiments can utilize a communications platform other than a satellite, such as a cellular tower, balloon, drone, terrestrial tower, etc., or a combination thereof. The satellite 120 may be located, for example, at a geostationary or non-geostationary orbital location. The satellite 120 may be communicatively coupled by at least one or more uplinks and/or one or more downlinks to one or more satellite terminals 130, via an antenna system. The term satellite terminal(s) 130 may be used to refer to a single satellite terminal or multiple satellite terminals such as satellite terminals 1301, 1302, 1303 collectively. A satellite terminal 130 is adapted for communication with a wireless communication platform such as satellite 120. Satellite terminals may include fixed and mobile satellite terminals including, but not limited to, a cellular telephone, a multi-media device, wireless handset, a wireless modem, a date transceiver, a paging or position determination receiver, a mobile radiotelephone or a computing device. A satellite terminal may be hand-held, portable (including vehicle-mounted installations for cars, trucks, boats, trains, planes, etc.) or fixed as desired. A satellite terminal may be referred to as a wireless communication device, a mobile station, a mobile wireless unit, a user, or a mobile user. In certain embodiments, the satellite terminal can be, or be part of, a navigational subsystem that has navigational capabilities. A satellite terminal 130 can be a user terminal type of satellite terminal, or a gateway type of satellite terminal, but is not limited thereto. As the term is used herein, a satellite terminal 130 is configured to communicate with at least one of the other satellite terminals 130 of the satellite communication system 100 utilizing at least one of the satellites 120.

Zero, one or more satellite terminals 130 may be coupled to one or more networks, such as, for example, the Internet, a public switched telephone network, mobile telephone network, a LAN, a WAN, etc. Where a satellite terminal 130 is a gateway type of satellite terminal, the satellite terminal 130 and the satellite 120 can communicate over a feeder link (also known as a feeder beam or gateway beam or hub beam), which has both an uplink 119 and a downlink 118. The satellite communication system 100 can include a one or more gateway type of satellite terminals, where each gateway type of satellite terminal provides an interface to the Internet, other network and/or other resource. Depending upon the type of satellite terminal 130, the link between the satellite terminal 130 and the satellite 120 can be referred to more descriptively as a Feeder link, a User link, or a Telemetry, Control, and Ranging (T, C & R) links (also known as Timing, Telemetry, and Control (TT&C) links) T, C & R links may share beams with Feeder links, or they may be provided in one or more T, C & R beams, typically using a separate spectrum allocation and link parameter configuration than the Feeder and User links. In certain embodiments, satellite terminals 130 may provide satellite signal data to support beamforming.

In FIG. 1, each of the satellite terminals $130_1$, $130_2$, $130_3$ and the satellite 120 communicate over one or more downlinks 118 ($118_1$, $118_2$, $118_3$) and/or one or more uplinks 119 ($119_1$, $119_2$, $119_3$). Three satellite terminals with three sets of uplinks and downlinks are depicted by way of example. Typical implementations will include many more satellite terminals than shown. Moreover, many satellite terminals (e.g., user terminal type satellite terminals) may be located within the geographic coverage area of a single spot beam referred to as a user beam or service beam. Many user beams may be included in various implementations. For example, fifty, sixty or more (or less) user beams may be used to generate a service region. A user link may operate in an assigned frequency band that is different than or the same as the frequency band assigned to a feeder link. For example, the user links that support user terminal type of satellite terminals may operate in the same assigned frequency band as a gateway type of satellite terminal, such as when a gateway type of satellite terminal is located in a coverage area spatially separated from the coverage areas of user beams for which the frequency is re-used. In other examples, one or more gateway type of satellite terminals supporting feeder links may be located in the same coverage area as a user beam coverage area and different frequency bands are used.

If the communication system of FIG. 1 is operating to provide access to a network (e.g., the Internet) for user terminal type of satellite terminals, one example of the communication operation may be as follows. A user terminal type of satellite terminal 130 contacts a host on the network by sending a communication to the gateway type of satellite terminal 130 via a satellite 120. The gateway type of satellite terminal 130 relays the communication to the host via the network. The host sends its reply to the user terminal type of satellite terminal 130 via the gateway type of satellite terminal 130, with the gateway type of satellite terminal 130 relaying the reply to the user terminal type of satellite terminal 130 via the satellite 120. It is also possible that a user terminal type of satellite terminal 130 may be contacted by an external source, such as a controller, another user, or an external service via a gateway, which relays the communication to the user terminal type of satellite terminal via one or more satellite. In other cases a wireless communication system may be or include a ground-based wireless network, such as a cellular, WiFi, or other such wireless network.

Figure 2:
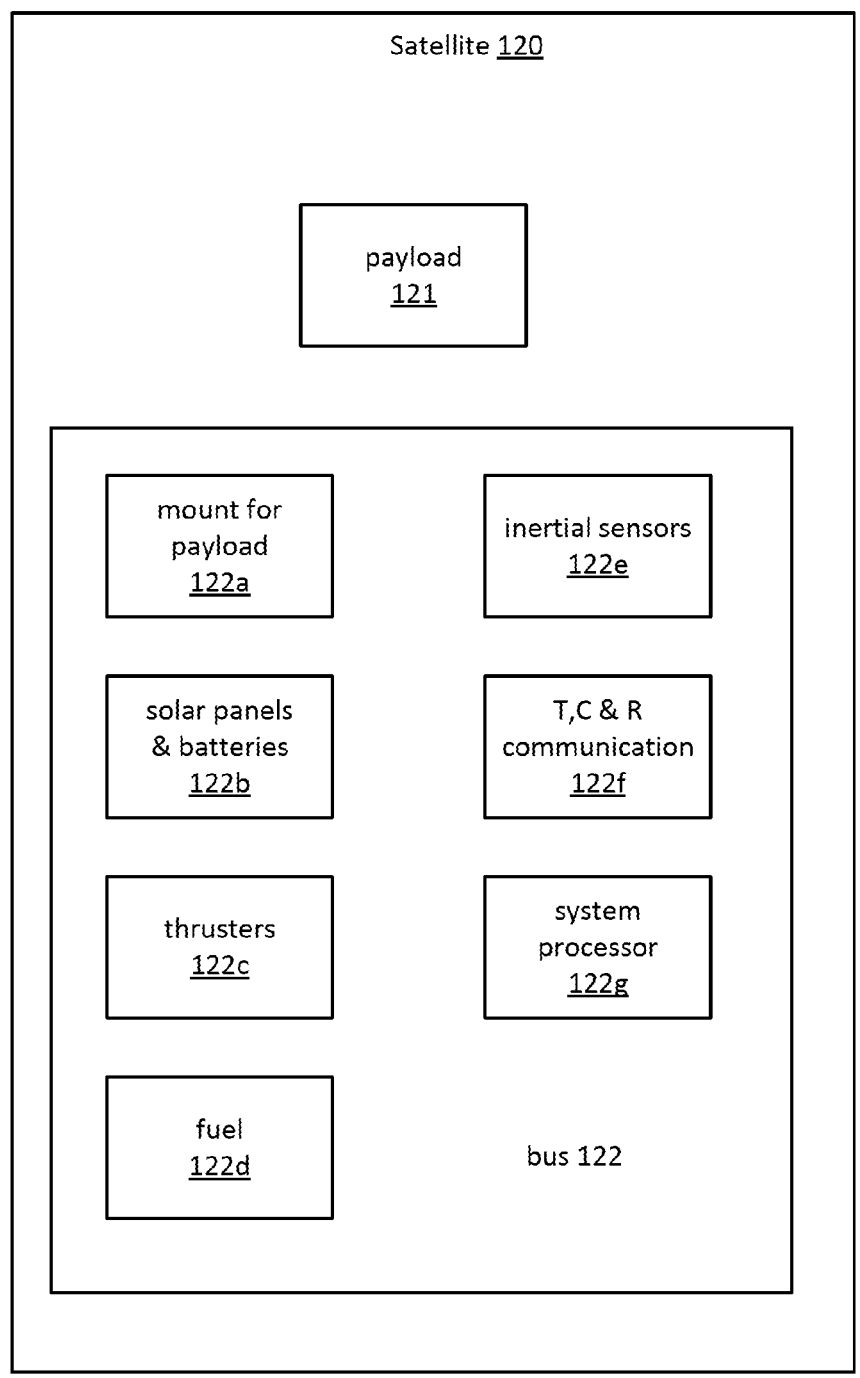
FIG. 2 is a high level block diagram used to describe one embodiment of a satellite of the satellite communication system introduced in FIG. 1.

FIG. 2 is a high level block diagram providing exemplary details of the satellite 120. In one embodiment, the satellite 120 includes a bus 122 and a payload 121 carried by the bus 122. Some embodiments of the satellite 120 may include more than one payload 121. The payload 121 can be, e.g., a communication payload that provides the functionality of at least part of a communication system described herein.

In general, the bus 122 is the spacecraft that houses the payload 121. For example, the bus includes one or more mounts 122*a* for holding/housing payload 121, solar panels and one or more batteries 122*b*, thrusters 122*c*, fuel 122*d*, inertial sensors 122*e*, T, C & R (telemetry, commands and ranging) communication and processing equipment 122*f*, and system processor 122*g*. T, C & R may referred to by other names, such as T, T & C (tracking, telemetry and control), as is known in the art. Solar panels and batteries 122*b* are used to provide power to satellite 120. Thrusters 122*c* are used for changing the position or orientation of satellite 120 while in space. Fuel 122*d* is for the thrusters. Inertial sensors 122*e* are used to determine the position and orientation of satellite 120. T, C & R communication and processing equipment 122*f*, includes communication and processing equipment for telemetry, commands from the ground to the satellite and ranging to operate the satellite. System processor 122*g* is used to control and operate satellite 120. An operator on the ground can control satellite 120 by sending commands via T, C & R communication and processing equipment 122*f* to be executed by system processor 122*g*. Some embodiments include a Network Control Center that wirelessly communicates with T, C & R communication and processing equipment 122*f* to send command and control the satellite 120.

In certain embodiments, the payload 121 is a communication payload that includes an antenna system that provides a set of beams comprising a beam pattern. In one example, an entire service region is covered using one beam. In another example, however, the antenna system provides a beam pattern that includes multiple spot beams, with each spot beam covering a portion of the service region. The portion of the service region covered by a spot beam is referred to as a cell. The individual spot beams (user beams) divide an overall service region into a number of cells. For example, U.S. patent application Ser. No. 11/467,490 describes a pattern of 135 spot beams covering the continental United States (CONUS), Hawaii, Alaska, and Puerto Rico. It is noted that a service region may be defined in any manner to cover any desired geographic location. In one embodiment, the antenna system includes a phased array antenna, a direct radiating antenna, or a multi-feed fed reflector.

Dividing the overall service region into a plurality of smaller cells permits frequency reuse, thereby substantially increasing the bandwidth utilization efficiency. In some examples of frequency reuse, a total bandwidth allocated to the downlink is divided into separate non-overlapping blocks for a forward downlink and a return downlink. Similarly, the total bandwidth allocated to the uplink can be divided into separate non-overlapping blocks for a forward uplink and a return uplink.

In other examples, some or all of the allocated bandwidth for user beams is reused by the satellite terminal(s) 130, thereby providing for simultaneous operation of at least a portion of a feeder link and a portion of a user link at common frequencies. For example, a forward uplink and a return uplink may reuse the same frequency and a forward downlink and a return downlink may reuse the same frequency. Simultaneous operation of a feeder link and a user link at common frequencies means that one or more gateway type of satellite terminals 130 may reuse any part of the total bandwidth allocated to user beams. This may be accomplished in various ways known in the art, such as by using spatial isolation, time domain isolation, code isolation, etc.

Figure 3:
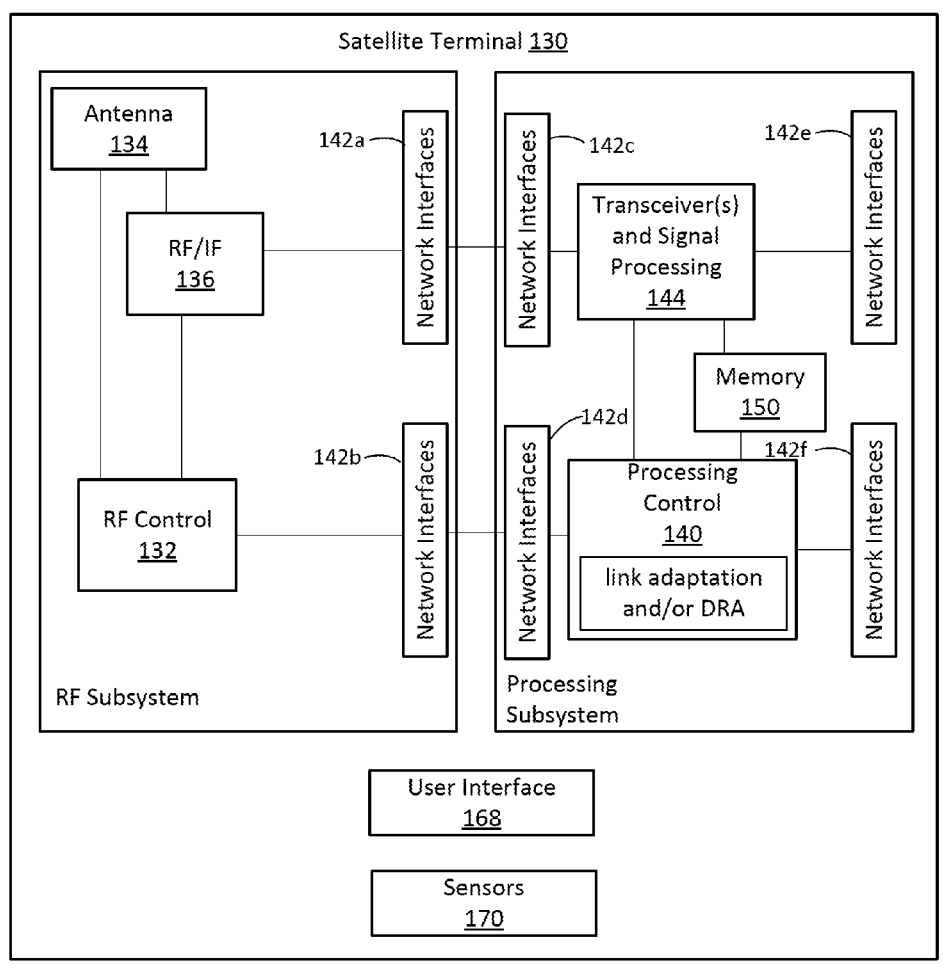
FIG. 3 is a high level block diagram used to describe one embodiment of a satellite terminal of the satellite communication system introduced in FIG. 1.

FIG. 3 is a high level block diagram providing exemplary details of one of the satellite terminals 130. In FIG. 3, the satellite terminal 130 is shown as including an RF sub-system (shown at the left) and a processing sub-system (shown at the right). The RF sub-system is shown as including an RF controller 132, an antenna 134, an RF/IF stage 136 and network interfaces 142*a* and 142*b*. The RF/IF stage 136 can be used to convert an intermediate frequency (IF) signal to a radio frequency (RF) signal, and vice versa. The processing sub-system is shown as including a transceiver(s) and signal processing stage 144, a processing controller 140, memory 150 and network interfaces 142*c*, 142*d*, 142*e* and 142*f*. In accordance with specific embodiments described herein, the processing controller 140 can perform dynamic link adaption and/or dynamic resource allocation (DRA). Each of the aforementioned controllers can be implemented, e.g., using one or more processors. The processing controller 140 may perform system controller functions such as dynamic link adaptation, dynamic resource allocation, return link power control, and/or forward link power control functions, but is not limited thereto. Alternatively, one or more of such system control functions may be performed by one or more other network nodes in the satellite communication system, or distributed across one or more network nodes, satellite terminals, and/or satellites in the satellite communication system. The various network interfaces, which can be referred to collectively as the network interfaces 142 or individually as a network interface 142, can be used to interface between sub-systems of a same satellite terminal 130, to interface to other satellite terminals and/or other network nodes in the satellite communication system, and/or to interface with other networks, such a public switched telephone network (PSTN), LANs and/or WANs, such as the Internet, as well as to one or more ground-based communication systems. One or more of the network interfaces 142 can be used to receive interference information and/or other types of situational awareness information, in accordance with certain embodiments discussed below. One or more of the network interfaces 142 can provide network connectivity within a satellite terminal (e.g., a gateway type of satellite terminal) and provide control, management, and data plane functions and connectivity. A network interface 142 may also enable communications with a central controller that has at least some control over the satellite communication system 100, or components thereof. One or more network interfaces 142 can be used to enable a satellite terminal 130 to communication with one or more other satellite terminals 130. The memory 150 can include one or more databases and/or other types of volatile and/or non-volatile memory, as is known in the art. As noted above, the controller 140 can perform dynamic link adaption and/or dynamic resource allocation (DRA). For example, the controller 140 can perform adaptive modulation and/or coding as part of its overall dynamic resource allocation function. It is also possible that dynamic link adaption and/or dynamic resource allocation can be performed by a central controller located external to the satellite terminal 130, but that is part of the satellite communication system 100. Other variations are also possible and within the scope of embodiments the present technology.

It is also possible that multiple controllers 140 are used for performing link adaption and allocating resources to multiple different portions of a particular satellite communication system. For example, a first controller can be used to perform link adaption and allocate resources associated with a first portion of the particular satellite communication system, and a second controller can be used to perform link adaption and allocate resources associated with a second portion of the particular satellite communication system. Additionally, a third controller can allocate resources to and/or associated with the first and second controllers. In an embodiment, the first and second controllers are associated with a same hierarchical level, and the third controller is associated with a higher hierarchical level than the first and second DRA controllers. The third controller may operate at a different rate with different input stimuli than the first and second controllers. The third controller may allocate separate pools of resources for the first and second controllers to use to allocate resources. Other variations are also possible and within the scope of embodiments of the present technology.

In FIG. 3, discussed above, the satellite terminal 130 was shown as including both an RF sub-system (shown at the left) and a processing sub-system (shown at the right). It is also possible that a satellite terminal 130 includes an RF sub-system (shown at the left), without including a processing sub-system (shown at the right), or at least a portion thereof. For example, it is possible that a user terminal type of satellite terminal 130 includes an RF sub-system that communicates, via a network interface 142, with a processing sub-system that is remotely located relative to the satellite terminal 130. In other words, an RF sub-system and a processing sub-system can be associated with separate nodes of the satellite communication system 100.

In accordance with an embodiment, one or more gateway type of satellite terminal 130 can include one or more controllers that is/are adapted to dynamically adapt configurable link parameters and/or dynamically allocate resources of the satellite communication system. It is also possible that one or more controllers, that is/are adapted to dynamically adapt configurable link parameters and/or dynamically allocate resources of the satellite communication system, are remotely located relative to the gateway type of satellite terminal(s) 130. For example, a central or regional controller can be adapted to dynamically determine and assign configurable link parameters and/or dynamically allocate resources of the satellite communication system. Further, it is noted that a gateway type of satellite terminal may also provide network services in addition to the controller services, wherein such network service can include, but are not limited to, header and data compression services, multicast services, and/or virtual private network (VPN) services.

Still referring to FIG. 3, the transceiver(s) 144 is/are connected to the antenna 134 (e.g., via a network interfaces 142 and/or an RF/IF stage 136) that enables the satellite terminal to send and receive wireless signals via a wireless communication system, such as the satellite communication system 100 introduced in FIG. 1. Each of the transceiver(s) 144 can include both a transmitter and a receiver. However, it is also possible that a satellite terminal includes a receiver, but not a transmitter, or a transmitter but not a receiver. In some cases the satellite terminal could be part of a satellite payload. The wireless signals received and sent using the transceiver(s) 144 and antenna 134 can be used for data, voice, and/or multimedia communications, as well as for navigational purposes. For example, the satellite terminal 130 can receive GPS signals and/or other types of signals that enable the transceiver(s) 144 and/or controller 140 to determine the present location of the satellite terminal. Software and/or firmware that causes the controller 140 to perform various functions can be stored in the memory 150. Where the satellite terminal is a user terminal type of satellite terminal, the satellite terminal can include a user interface 168 that enables a user to interact with the satellite terminal 130. Such a user interface 168 can include various input/output components, such as, but not limited to, a display (e.g., a touchscreen), buttons, a speaker, a microphone, and/or the like. The user interface 168 can be used to enable a user to make a telephone call, download data from a remote server, upload data to a remote server, and/or the like. Where the satellite terminal is a mobile terminal that has navigational capabilities, the user interface can be used to accept a target destination, as well as to provide navigational directions (visual and/or auditory) to a user. The user of a satellite terminal can be a person. It is also possible that the user of a satellite terminal is an autonomous or semi-autonomous vehicle that relies on signals received via the satellite terminal to perform autonomous, semi-autonomous or remotely controlled navigation. The transceiver(s) 144 and/or controller 140 can be used to determine a present location of the satellite terminal, e.g., by measuring ranges (the distance between a satellite with known coordinates in space and the satellite terminal) of several satellites and/or terrestrial towers and computing the geometric intersection of these ranges. For example, to determine a range, a transceiver 144 (or simply a receiver) can measure the time required for a GPS location signal to travel from a satellite to the satellite terminal. GPS and/or other location measurements can be provided to the controller 140. The satellite terminal 130 can also include one or more sensor(s) 170, which may include a direction (azimuth) sensor, such as a magnetometer, and/or an acceleration sensor, such as an accelerometer, but is not limited thereto. The memory 150 can store geographic information and provide such information to the controller 140. The geographic information may include geographical coordinate data corresponding to land, sea and/or space coordinates. The satellite terminal 130 can also include many other components, such as, but not limited to, a power supply (e.g., a battery), one or more down-converters, up-converters, high power amplifiers (HPAs), and/or filters, just to name a few.

A particular satellite communication system, such as system 100 described above with reference to FIG. 1, can utilize spatial isolation, frequency domain isolation, time domain isolation, code isolation, power control, interference cancellation, etc. to mitigate and optimally prevent intra-system interference of the particular satellite communication system from adversely affecting the communication capabilities of its satellite terminals 130 and other components. However, there will be many instances where an interference source is outside of the control of the particular satellite communication system, yet still needs to be accounted for by the particular satellite communication system. Such external interference, which may adversely affect a particular satellite communication system, may be caused, e.g., by user error, cross-polarization leakage, adjacent satellites, terrestrial services and deliberate interferers, as mentioned above. The external interference can be electromagnetic interference (EMI), which can include co-channel interference (CCI) and/or adjacent-channel interference (ACI), but is not limited thereto.

Over the relatively long term, interferers may be identified and then modified or shut down as appropriate, if possible. However, in the relatively short term (e.g., during a period of time which a communication link is being supported for a satellite terminal), some satellite communication systems may adapt to interference only after a satellite terminal of one of the satellite communication systems has dropped a link or has informed a subsystem of its satellite communication system (which is responsible for dynamic link adaption and/or dynamic resource allocation (DRA)) of their poor link quality. In other words, satellite communication systems typically deal with interference in a reactive manner, as opposed to in a proactive prophylactic manner. Certain embodiments of the present technology, which are described below, deal with external interference in a proactive prophylactic manner. Such embodiments can be used to more readily provide a specified quality of service (QoS) to a satellite terminal, as well as to reduce overall power used by a particular satellite communication system by reducing how often its satellite terminals, and/or satellites must increase signal power and/or by changing modulation, coding, burst rate, resource assignment, and/or the like to compensate for interference.

Figure 4:
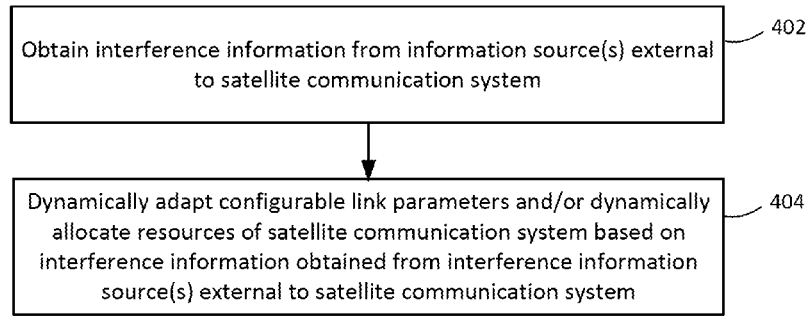
FIG. 4 is a high level flow diagram that is used to summarize certain embodiments of the present technology that dynamically adapt configurable link parameters and/or dynamically allocate resources of a satellite communication system based on interference information obtained from one or more interference information sources external to the satellite communication system.

Referring to the high level flow diagram of FIG. 4, in accordance with certain embodiments, one or more subsystems of a particular satellite communication system obtains interference information from one or more interference information sources external to the particular satellite communication system, as indicated at step 402. Interference, as the term is used herein, refers to non-weather related interference that can adversely affect efficacy of the particular satellite communication system. Accordingly, unless stated otherwise, the term interference, when used herein, refers to non-weather related interference. By contrast, when the intention is to refer to weather related interference, specific types of weather related interference, such a rain fade, will be referred to, or the more generic term weather related interference will be used. This terminology has been chosen because weather related interference, such as rain fade, is generally more of an attenuator than an active interferer, and thus, is often compensated for in a different manner than active transmitting types of interferers.

Figure 5:
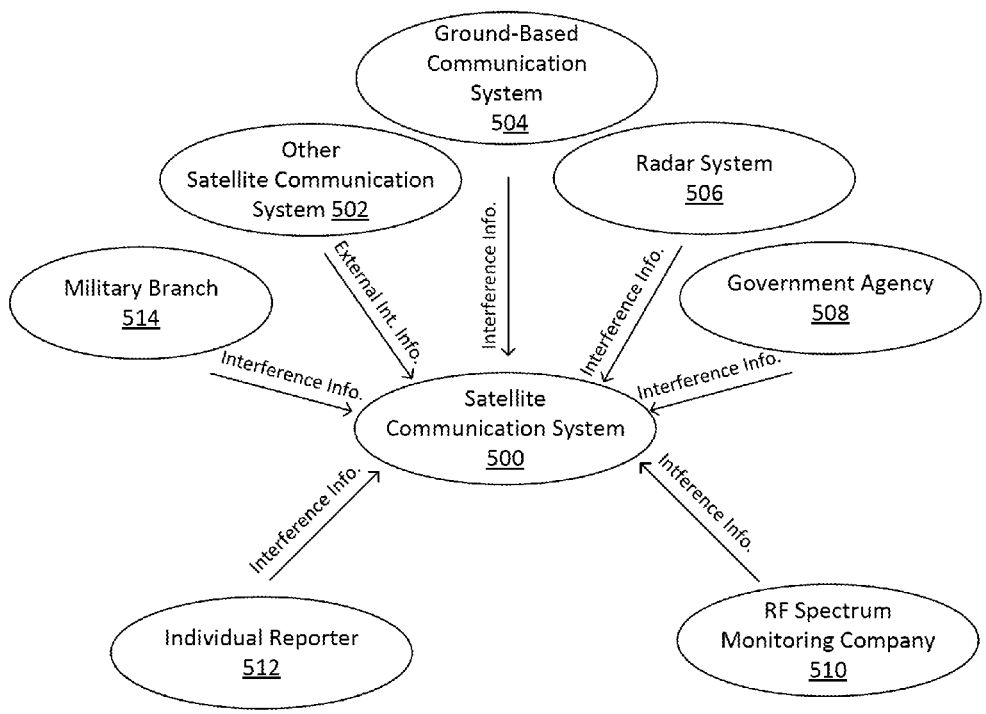
FIG. 5 is used to describe exemplary interference information sources that are external to a particular satellite communication system.

FIG. 5 is used to describe exemplary interference information sources 502-514 external to a particular satellite communication system 500. Such interference information sources 502-514, which can also be referred to more succinctly as external interference information sources, are not controlled by or otherwise associated with the particular satellite communication system 500. As shown in FIG. 5, external interference information sources can include another satellite communication system 502, a ground-based communication system 504, a radar system 506, a government agency 508, an RF spectrum monitoring company 510, an individual reporter 512, and a military branch 514, but are not limited thereto.

The other satellite communication system 502 may have a terrestrial coverage area that at least partially overlaps that terrestrial coverage area of the particular satellite communication system 500. For example, one or more spot beams provided by the other satellite communication system 502 may at least partially overlap one or more spot beams provided by the particular satellite communication system 500. The other satellite communication system 502 may receive interference information from its own satellite terminals and/or other communication or monitoring equipment in order to overcome or avoid such interference. Typically, different satellite communication systems have not shared interference information with one another. Here it is being proposed that different satellite communication systems share interference information with each other for the mutual benefit of both systems, by contracting or otherwise agreeing to do so. Alternatively, a signal monitoring system may provide services to monitor specific frequency bands in one or more coverage areas for general or specific types of signals and report to a service consumer, such as a satellite communication system. More generally, it is proposed that a particular satellite communication system obtain interference information from a different satellite communication system, wherein the different satellite communication system or a subsystem thereof is an example of an external information source. In other words, an external interference information source for a particular satellite communication system can be another satellite communication system or a subsystem thereof.

As mentioned above, another example of an external interference information source is a ground-based communication system 504 or a subsystem thereof. Such a ground-based communication system 504 may have a coverage area that at least partially overlaps the coverage area of the particular satellite communication system. The ground-based communication system may receive interference information from its own user terminals and/or other communication or monitoring equipment in order to overcome or avoid such interference. Typically, satellite and ground-based communication systems do not share interference information with one another. Here it is being proposed that ground-based and satellite communication systems share interference information with each other for the mutual benefit of both systems, by contracting or otherwise agreeing to do so. More generally, it is proposed that the particular satellite communication system 500 or a subsystem thereof receives interference information from a ground-based communication system 504 or a subsystem thereof, wherein the ground-based communication system or the subsystem thereof is an example of an external interference information source.

Another example of an external interference information source is a radar system 506. A radar system can be used for various different purposes, such as, but not limited to, air traffic control, radar astronomy, air-defense systems, anti-missile systems, marine radars to locate landmarks and other ships, aircraft anti-collision systems, ocean surveillance systems, outer space surveillance and rendezvous systems, meteorological precipitation monitoring, and altimetry and flight control systems. Some radar systems may operate continually, while others may operate periodically or on a schedule, or on-demand. While radar systems are typically designed to use a different portion of the radio frequency spectrum than satellite communication systems, it is has been shown that satellite communication systems are susceptible to interference from radar signals generated by radar systems. In accordance with specific embodiments of the present technology, one or more radar systems 506 provide interference information to the particular satellite communication system 500 or a subsystem thereof. The interference information provided by the radar system 506 can include, for example, the frequency of its transmitted radar signals, the location from which the radar signals are emitted, the direction(s) in which the radar signals are emitted, and/or the time(s) at which the radar system emits radar signals. Further, if the radar system 506 detects any radar jamming signals and/or other types of interference, the radar system 506 can also provide interference information about the radar jamming signal and/or other types of interference to the particular satellite communication system 500.

Another example of an external interference information source is a government agency 508, such as the Federal Communication Commission (FCC), which may monitor and receive information about interference and RF traffic in general. Still another example of an external interference information source is a company 510 that is in the business of monitoring interference, or more generally, wireless RF traffic in general. For example, such a company or government agency may utilize commercially available or custom spectrum monitoring equipment to obtain RF traffic and interference information and contract or otherwise agree to provide such information to a particular satellite communication system. Such spectrum monitoring equipment is available from companies such as Real-Time Logic, Inc. (headquartered in Colorado Springs, Colo.), Rohde & Schwarz (headquartered in Munich, Germany) and Keysight Technologies (headquartered in Santa Rosa, Calif.), just to name a few. A government agency 508 or a company 510 may perform such monitoring, e.g., to confirm compliance with frequency allocations, transmission power limits and/or other communication regulations, as well as to identify intentional radio jamming sources. Another example of an external interference information source is an individual reporter 512, which can be a person or company that reports interference to the satellite communication system 500, e.g., if the person or company thinks the satellite communication system 500 is responsible for the interference. Even where the satellite communication system 500 is not responsible for the reported interference, the satellite communication system 500 may use the information obtained from the individual reporter 512 to proactively prevent or mitigate adverse effects of the reported interference on the efficacy of the satellite communication system.

For another example, an external interference information source can be a military branch 514, such as, but not limited to the U.S. Army, Navy, Air Force and/or Marines, each of which may have military reasons for monitoring the RF spectrum, and may agree to share certain interference information with other entities, such as the satellite communication system 500, that may benefit from such information.

Referring again to the high level flow diagram of FIG. 4, in accordance with specific embodiments of the present technology, one or more subsystems of a particular satellite communication system dynamically adapt configurable link parameters and/or dynamically allocate resources of the particular satellite communication system based on the interference information obtained from one or more external interference information sources (some examples of which were discussed above), as indicated at step 404. In accordance with certain embodiments, the particular satellite communication system dynamically adapts configurable link parameters and/or dynamically allocates its resources, based on the interference information received from one or more external interference information sources, to proactively prevent or mitigate adverse effects of non-weather related interference on the efficacy of the particular satellite communication system. The term "based on," as used herein, means "based at least in part on," unless stated otherwise. Accordingly, if a subsystem of a particular satellite communication system dynamically adapts configurable link parameters and/or dynamically allocates resources of the particular satellite communication system based on the interference information received from one or more external interference information sources, the particular satellite communication system can also perform its dynamic allocation of its resources based on other information, such as, but not limited to, intra-system interference information, satellite terminal locations, traffic data classifications (e.g., real time traffic, jitter tolerant traffic, etc.), quality of service (QoS) constraints, data rates, and satellite terminal reported signal degradation information, just to name a few. In other words, in accordance with certain embodiments described herein, a particular satellite communication system takes into account more than just interference information obtained from external interference information source(s) when performing dynamic resource allocations.

Instances of the interference information obtained from external interference information source(s) can include information about a geographic location and/or region associated with an instance of non-weather related interference, as well as information about a frequency or frequencies, frequency band or bands, power spectral density, a polarization or polarizations and/or a code or codes, as well as dynamic characteristics associated with the instance of non-weather related interference. Instances of the interference information obtained from external interference information source(s) can additionally, or alternatively, include information about interference signal levels, and/or interference type, such as broadband, pulsed (and on/off durations), frequency hopped, etc. These are just a few examples of the types of interference characterizations that can be included in the interference information received from external interference information sources. Such interference information can be utilized, e.g., by one or more dynamic link adaptation and/or dynamic resource allocation (DRA) controllers of the particular satellite communication system, to adapt link configuration parameters for and/or allocate resources to a satellite terminal located within a geographic region associated with one or more instances of non-weather related interference. For example, a satellite terminal can be allocated resources of the satellite communication system that have a different frequency, a different frequency band, a different polarization, and/or a different code than the instance of non-weather related interference associated with the geographic region. For another example, capacity allocations can be adapted based on interference knowledge to enable users, user groups, or services allocated capacity that has been reduced by an interferer to better assign resources within capacity allocations to best provide services. Configurable link parameters of a satellite communication system, that can be dynamically adapted based on interference information received from one or more external interference information source(s), can, for example, be associated with one or more of an uplink modulation, downlink modulation, uplink forward error correction coding, downlink forward error correction (FEC) coding, uplink burst rate, downlink burst rate, uplink channel and/or subchannel characteristics, uplink bandwidth, downlink bandwidth, uplink power, downlink power, uplink polarization, downlink polarization, uplink transmission frequency bands, downlink transmission frequency bands, uplink channel and/or subchannel assignments, downlink channel and/or subchannel assignments, uplink beam assignments, and/or downlink beam assignments, but are not limited thereto. Resources of a satellite communication system, which can be dynamically allocated based on interference information received from one or more external interference information source(s), can, for example, be associated with one or more of an uplink spectrum spreading code and/or multiple access code, downlink spectrum spreading code and/or multiple access code, uplink transmission time slots, downlink transmission time slots, uplink bandwidth, downlink bandwidth, uplink power, downlink power, uplink polarization, downlink polarization, uplink transmission frequency bands, downlink transmission frequency bands, uplink channel and/or subchannel assignments, downlink channel and/or subchannel assignments, uplink beam assignments, and/or downlink beam assignments, but are not limited thereto. In certain embodiments, link configuration parameters may be assigned as specific combinations of parameters, such as modulation, FEC coding, and burst rate, that define assignable modes. In certain embodiments, these modes may have associated time slots and bandwidths. Thus, when assigning a time slot resource, it may also have an associated mode and bandwidth associated with it. Resources of a satellite communication system may be partitioned into capacity allocations of communication resources. Dynamic resource assignments can be made from within these allocations. Allocations may be to channels, beams, user groups, services, etc., or combinations thereof. In certain embodiments, capacity allocations are made at a slower rate than resource assignments, but both may be dynamic. Depending upon the implementation, capacity allocations may be, for example, to specific sets of resources, or to a percentage of a pool of resources. Dynamic resource allocation can additionally, or alternatively, involve switching multiple signals in order to conserve downlink resources. Dynamic resource allocation can also involve applying a different algorithm or algorithm configuration parameters to different frequencies and beams in dependence on interference characteristics. Algorithm or algorithm configuration parameters may, for example, be related to modulation and coding mode assignment hysteresis parameters and behavior for adaptive modulation and coding. Exemplary interference characteristics include, but are not limited to, a frequency (or frequencies) and geographic region associate with the interference. Additional characteristics of interference, which can potentially also be quantified, includes code information, polarization, timing information, power information, and the like. Dynamic resource allocation can also involve selecting a type of interference mitigation or cancellation technique specific to instances of interference.

There are various different RF bands that can be used for RF communication, including, e.g., the cellular band (approximately 869-894 MHz, which is divided into two frequency blocks), the PCS band (approximately 1850-1990 MHz, which is divided into six frequency blocks), the S-band (approximately 2-4 GHz), the C-band (approximately 4-8 GHz), the X-band (approximately 8-12 GHz), the Ku-band (approximately 12-18 GHz), the Ka-band (approximately 26-40 GHz) and the V-band (approximately 37-50 GHz). The cellular and PCS bands are used for terrestrial wireless voice and/or data communications. The S-band is typically used for weather radar, surface ship radar, and some communications satellites. The C-band is primarily used for satellite communications, for full-time satellite TV networks or raw satellite feeds. The X-band is primarily used by the military, and by civil, military and government institutions for weather monitoring, air traffic control, maritime vessel traffic control, defense tracking and vehicle speed detection for law enforcement. The Ku-band is primarily used for satellite communications. The Ka-band us primarily used for satellite communications, and high-resolution, close-range targeting radars on military aircraft. The V-band is primarily used for crosslink communication between satellites in a constellation, and for high capacity, short distance (less than 1 mile) communications. Other exemplary frequencies that are used for RF communication include the L1, L2, L3, L4 and L5 bands (respectively, approximately 1575.42 GHz, 1227.60 GHz, 1381.05 GHz, 1379.913 GHz and 1176.45 GHz) that are used by GPS satellites to broadcast signals (e.g., ranging signals) that enable GPS receives on or near the Earth's surface to determine location and synchronized time. Interference that is occurring within one particular frequency band will typically not affect communication capabilities in another frequency band, unless the bands are sufficiently close to one another that sidebands from one band bleed into another band.

In accordance with certain embodiments of the present technology, a particular satellite communication system only receives interference information from external interference information source(s) if the interference information corresponds to interference that is within a band used by the particular satellite communication system, or is sufficiently close to the frequency band(s) used by the particular satellite communication such that sidebands from the interference may bleed in the frequency band(s) used by the particular satellite communication. More generally, in accordance with certain embodiments, a particular satellite communication system only obtains interference information from external interference information source(s) if the interference information corresponds to a predetermined range (or ranges) of frequencies, which can be predetermined by and/or for the particular satellite communication system.

In accordance with alternative embodiments, a particular satellite communication system receives interference information from external interference information source(s) regardless of whether the interference information corresponds to interference that is within a band used by the particular satellite communication system, and regardless whether the interference is sufficiently close to the frequency band(s) used by the particular satellite communication such that sidebands from the interference may bleed in the frequency band(s) used by the particular satellite communication. More generally, in accordance with certain embodiments, a particular satellite communication system receives interference information from external interference information source(s) regardless of whether interference information corresponds to a predetermined range (or ranges) of frequencies. In such embodiments the particular satellite communication system can choose to ignore or otherwise not act on interference information (from external interference information source(s)) corresponding to interference that it outside a predetermined range (or ranges) of frequencies that may affect communication capabilities of the particular satellite communication system.

Figure 6:
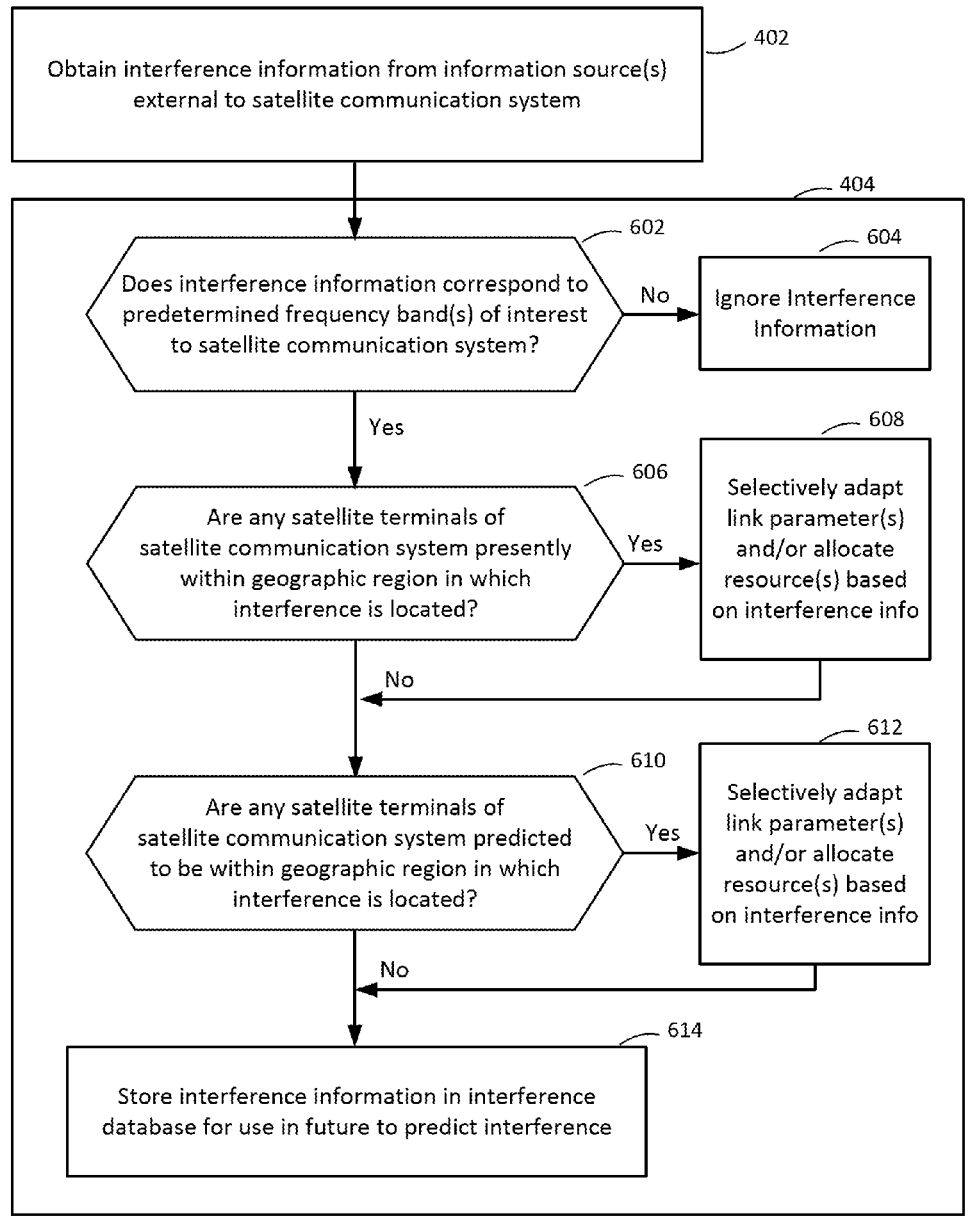
FIG. 6 is a high level flow diagram that is used to provide some additional details of one of the steps introduced in FIG. 4, according to specific embodiments of the present technology.

FIG. 6 will now be used to provide some additional details of step 404, introduced in FIG. 4, according to specific embodiments of the present technology. Referring to FIG. 6, as indicated at step 602, after obtaining (at step 402) interference information from source(s) external to a particular satellite communication system, there is a determination of whether the interference information corresponds to a predetermined frequency band (or bands) of interest to the particular satellite communication system that may affect communication capabilities of the particular satellite communication system. If the answer to the determination at step 602 is no, then the obtained interference information can be ignored, as indicated at step 604, e.g., by not using such information in any algorithms that are used to dynamically allocate resources of the particular satellite communication system.

If the answer to the determination at step 602 is yes, then there is a determination at step 606 whether there are any satellite terminals, of the particular satellite communication system, that are presently located within the geographic region in which the interference is located. If the answer to the determination at step 606 is yes, then the interference information is used to selectively adapt one or more link parameters and/or allocate one or more resource(s) that are utilized by the satellite terminal(s). For example, if the interference is within a particular frequency range and within a particular geographic region within which one or more satellite terminals are located, then the interference information can be used in one or more algorithms that are used to reassign or initially assign resources used by the satellite terminals to attempt to ensure that the quality of service (QoS) designations for the satellite terminals are satisfied. As noted above, the satellite terminals can be user terminals or gateways, but are not limited thereto. In certain embodiments, if the interference prevents meeting QoS (e.g., per service level agreements), then new capacity allocations (within which resources are dynamically assigned) may be evaluated and reallocated to best provide service in the presence of the interference. Dynamic reallocations may also be performed in response to changing capacity needs within the system, e.g., in response to trending changes, planned changes and/or sudden changes, such as those caused by interference, or in response to combinations of the these changes. As noted above, in certain embodiments capacity reallocations are done at a lower rate than resource assignments.

At step 610 there is a determination whether there are any satellite terminals, of the particular satellite communication system, that is/are predicted to be within a geographic region in which the interference is located. A satellite terminal may be predicted to move within a geographic region in which the interference is located, for example, if the satellite terminal is moving toward the geographic region in which the interference is located, or if the source of the interference is moving toward the geographic region in which the satellite terminal is located, or if the source of interference and the satellite terminal are moving toward one another, or toward a common geographic region. Information about the location of satellite terminals can be obtained from the satellite terminals themselves, from some other subsystem of the particular satellite communications system, or from a system external to the particular satellite communication system, using, for example, GPS or other triangulation techniques. It is also possible that location information for satellite terminals, and/or interference sources, can be obtained using radar, visual tracking, thermal tracking, infrared (IR) signatures and/or other techniques. Such techniques can also be used to monitor the movement of the satellite terminals and/or interference sources, to predict where the satellite terminals and/or interference sources will be located at various windows of time in the future.

If the answer to the determination at step 610 is yes, then the interference information is used to selectively adapt one or more link parameters and/or allocate one or more resource(s) that are utilized by the satellite terminal(s), as indicated at step 612. For example, if the interference is within a particular frequency range and in the near future is expected to be within a particular geographic region within which one or more satellite terminals is/are predicted to be located, then the interference information can be used in one or more algorithms that is/are used to reassign or initially assign resources used by the satellite terminals to attempt to ensure that the quality of service (QoS) designations for the satellite terminals are satisfied.

Still referring to FIG. 6, at step 614, interference information from external interference information source(s) is stored in an interference information database, and can be used alone or in combination with interference information obtained by the particular satellite communication system, to predict when and where certain types of interference may occur in the future. Such information can then be used in the future to dynamically allocate resources of the particular satellite communication system.

In certain embodiments described above, interference information is obtained from one or more interference information sources external to the satellite communication system, and configurable link parameters of the satellite communication system are dynamically adapted based on the interference information and/or resources of the satellite communication system are dynamically allocated based on the interference information. The various examples of non-weather related active interference discussed above are exemplary types of situational awareness information that a satellite communication system can use to dynamically adapt configurable link parameters and/or dynamically allocate resources of the satellite communication system. Additionally, or alternatively, other types of situational awareness information can be obtained by the satellite communication system from one or more from one or more situational awareness information sources external to the satellite communication system. In such an embodiment, configurable link parameters of the satellite communication system can be dynamically adapted and/or resources of the satellite communication system can be dynamically allocated, also (or instead) based on the other types of situational awareness information obtained from the one or more situational information sources that is/are external to the satellite communication system. Another type of situational awareness information includes, for example, line of sight blockage information, which could be detectable based on link quality-related information, and can be considered a passive form of interference. Additionally, or alternatively, the susceptibility of a geographic location or area to line of sight blockage could be derived from terrain-related data, which is another example situational awareness information. Additional types of passive interference types of situational awareness information, which a satellite communication system can obtain from sources external to the satellite communication system, include space weather information, earth weather information, celestial information, physical hazard related information (e.g., about tall buildings, cranes, bridges, fires, etc.), and temporary flight restriction information, just to name a few.

Figure 7:
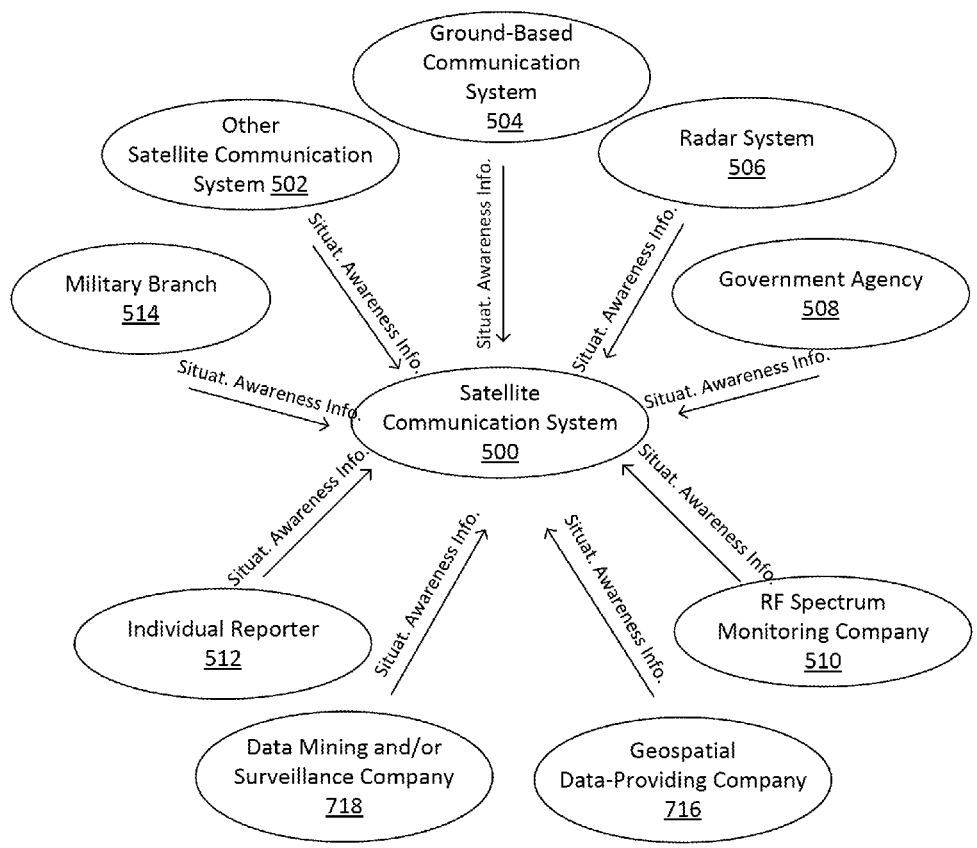
FIG. 7 is used to more generally describe exemplary situational awareness information sources that are external to a particular satellite communication system.

FIG. 7 is used to more generally describe exemplary situational awareness information sources external to a particular satellite communication system 500. Such situational awareness information sources external to the particular satellite communication system 500, which can also be referred to more succinctly as external situational awareness information sources, are not controlled by or otherwise associated with the particular satellite communication system 500. As shown in FIG. 7, the same sources that were described above, with reference to FIG. 5, as being exemplary external interference information sources, are more generally external situational awareness information sources. Accordingly, exemplary external situational awareness information sources include another satellite communication system 502, a ground-based communication system 504, a radar system 506, a government agency 508, an RF spectrum monitoring company 510, an individual reporter 512, and a military branch 514. Additional examples of external situational awareness information sources include a geospatial data providing company 716 and a data mining and/or surveillance company 718. These are just examples, which are not intended to be an encompassing.

In additional to a satellite communication system dynamically adapting its configurable link parameters and/or dynamically adapting its resources based on situational awareness information obtained from sources external to a particular satellite communication system, the satellite communication system will likely also dynamically adapt its configurable link parameters and/or dynamically adapt its resources based on situational awareness information received from one or more sub-systems of the satellite communication system. In other words, a satellite communication system can also use internal situational awareness information (including internal interference information) to dynamically adapt its configurable link parameters and/or dynamically adapt its resources. Accordingly, when a satellite communication system dynamically adapts its configurable link parameters and/or dynamically adapts its resources based on situational awareness information obtained from external sources of such information, the satellite communication system will likely also dynamically adapt its configurable link parameters and/or dynamically adapt its resources based on internal sources of such information. Thus, unless stated otherwise, when a satellite communication system dynamically adapts its configurable link parameters and/or dynamically adapts its resources based on interference information (or, more generally, situational awareness information) obtained from external sources of such information, it is presumed that the satellite communication system also dynamically adapts its configurable link parameters and/or dynamically adapt its resources based on internal sources of such information.

The steps described above (e.g., with reference to FIGS. 4 and 6) can be performed, e.g., by one or more controllers (e.g., 140) or some other subsystem(s) of a particular satellite communication system. The controller(s) or other subsystem(s), which performs such steps, can be located within a gateway. Alternatively, the controller(s) or other subsystem(s) can be at another site, e.g., a central network control center site, or the functionality of the controller(s) can be distributed among multiple components or nodes of the satellite communication system 100. The controller(s) can be implemented using hardware, software or firmware, or combinations thereof. Accordingly, the controller(s), or at least a portion thereof, can be implemented using one or more processors. It is also possible that multiple controllers are used for allocating resources to multiple different portions of a particular satellite communication system. For example, a first controller can be used to allocate resources associated with a first portion of the particular satellite communication system, and a second controller can be used to allocate resources associated with a second portion of the particular satellite communication system. Additionally, a third controller can allocate resources to and/or associated with the first and second controllers. In an embodiment, the first and second controllers are associated with a same hierarchical level, and the third controller is associated with a higher hierarchical level than the first and second controllers. Other variations are also possible and within the scope of embodiments of the present technology.

In the above described embodiments, a satellite communication system was described as being the particular communication system that obtains interference information and/or other types of situational awareness information from one or more sources external to the particular communication system, and that dynamically adapt its configurable link parameters and/or dynamically allocates resources of the particular communication system based on the interference information and/or situational awareness information obtained from the one or more sources that is/are external to the particular communication system. Alternatively, the particular communication system can be a ground-based communication system. In other words, a ground-based communication system can be the particular communication system that obtains interference and/or other situational awareness information from one or more interference information and/or other situational awareness information sources external to the particular communication system, and that dynamically adapts configurable link parameters and/or dynamically allocates resources of the particular communication system based on the interference and/or other situational awareness information obtained from the one or more interference and/or other situational awareness information sources that is/are external to the particular communication system. The particular communication system can alternatively be a communication system that is a combination of a satellite and ground-based communication system. The particular communication system may also include other subsystems, besides satellites and ground-based cell towers, which include communication payloads, such as, but not limited to, drones and/or balloons.

Mobile satellite, cellular and/or wi-fi terminals (which can also be referred to as mobile communication terminals or more succinctly as mobile terminals) often rely on a wireless communication system (e.g., a satellite and/or a ground-based (e.g., ground, airborne, and/or marine-based) communication system) to obtain navigational route information used for directing the mobile terminals from their present locations to target locations. Such mobile terminals can be, e.g., mobile telephones, mobile multi-media devices and/or navigational subsystems of manned, autonomous or semi-autonomous vehicles. For example, many vehicles include a navigational subsystem that relies on global positioning system (GPS) satellites to track a present location of the vehicle, which is used by software to determine and provide directions to a driver or to a computer that controls an autonomous or semi-autonomous vehicle. When following one of the routes, a mobile terminal can potentially lose one or more communication capabilities. In other words, a mobile terminal may lose a communication capability while travelling between a present location of the mobile terminal and a target destination for the mobile terminal. Exemplary types of communication capabilities that may be lost, at least temporarily, include a GPS or other navigation capability and a voice telephony capability. When a GPS or other navigation capability is lost, the mobile terminal may at least temporarily not be able to determine its location. This may be frustrating to a driver that was following directions provided by a navigational subsystem type of mobile terminal. This may be catastrophic to an autonomous or semi-autonomous vehicle that was following the directions provided by a navigational subsystem.

Autonomous or semi-autonomous vehicles can utilize navigational subsystems to autonomously or semi-autonomously transport people and/or cargo from one location to another. Autonomous or semi-autonomous vehicles (e.g., drones) can alternatively utilize navigational subsystems to perform surveillance, e.g., in hostile territories. Alternatively, or additionally, autonomous or semi-autonomous vehicles can utilize navigational subsystems to carry a communication payload. For example, drones that carry a communication payload may be directed to fly over specific geographic regions at specific times to add communication capabilities to areas that would otherwise not be satisfactorily serviced, e.g., because of high traffic demands or communication dead zones.

Some navigational subsystems allow a driver to select from among different routes that have different characteristics, such as, but not limited to, a shortest distance route, a shortest travel time route, a least amount of highway travel route, and a most amount of highway travel route. However, navigational subsystems have not typically taken into account that certain routes, if taken, may cause the navigational subsystem, or more generally a mobile terminal, to lose one or more communication capabilities. In other words, when directing a mobile terminal from a present location to a target location, navigational subsystems do not typically take into account that the mobile terminal may lose a specific type of communication capability while travelling between a present location and a target destination.

If a person (e.g., a driver) is relying on their mobile terminal to guide them from their present location to a target destination, the person may become lost or at least confused if the mobile terminal loses its GPS navigation capability during the period of time that the person is following turn-by-turn or other directions provided by the mobile terminal. To prevent, or reduce the chance of this happening, certain embodiments take into account that the person may prefer to travel a longer route that mitigates, and preferably eliminates, the probability that the mobile terminal will lose a specific type of communication capability while travelling between the present location of the mobile terminal and the target destination for the mobile terminal.

If an autonomous or semi-autonomous vehicle is relying on a mobile terminal to guide it from its present location to a target destination, the autonomous or semi-autonomous vehicle may become lost or at least confused, and may potentially cause an accident, if the mobile terminal loses its GPS navigation capability. To prevent, or reduce the chance of this happening, certain embodiments take into account that it may be better for the autonomous or semi-autonomous vehicle to travel a longer route that mitigates, and preferably eliminates, the probability that the mobile terminal will lose a specific type of communication capability while travelling between the present location of the mobile terminal and the target destination for the mobile terminal.

If an autonomous or semi-autonomous vehicle is using a satellite communication system to provide real time surveillance information to soldiers during a military mission, then the military mission may become compromised if the autonomous or semi-autonomous vehicle loses its communication link with the satellite communication system. To prevent, or reduce the chance of this happening, certain embodiments will take into account that it may be better for the autonomous or semi-autonomous vehicle to travel an alternate (e.g., longer) route that mitigates, and preferably minimizes the probability that the mobile terminal will lose a specific type of communication capability while travelling between the present location of the mobile terminal and the target destination for the mobile terminal.

Figure 8:
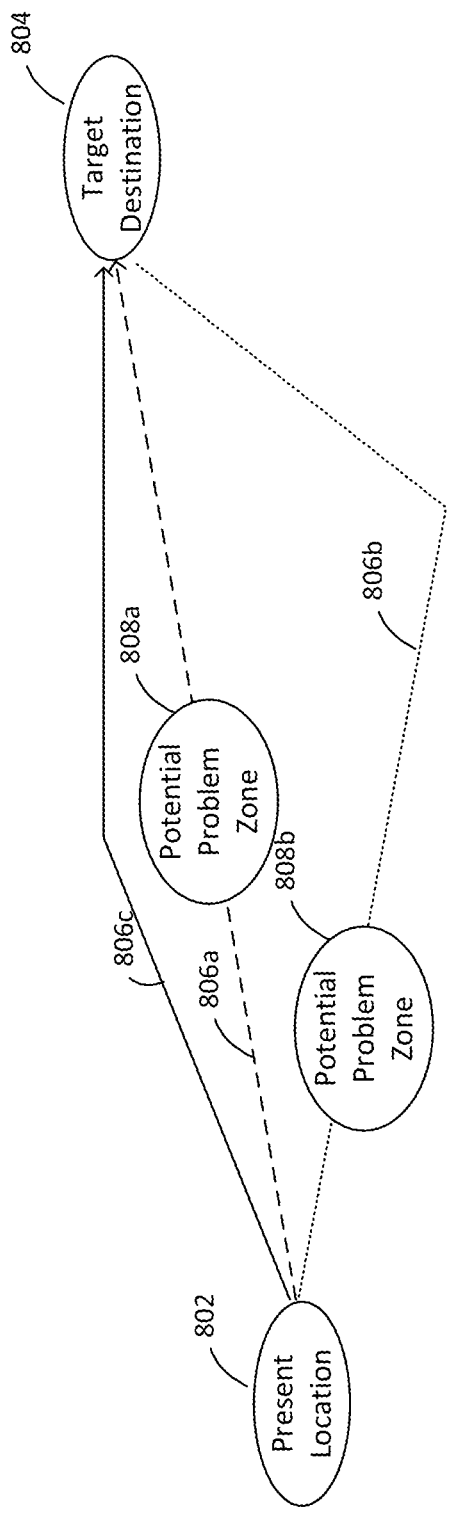
FIG. 8 is used to illustrate various potential navigational routes between a present location of a mobile satellite terminal and a target destination for the mobile satellite terminal, as well as various potential problems zones between the present location and the target destination.

Referring briefly to FIG. 8, an exemplary present location 802 of a mobile terminal and an exemplary target destination 804 for the mobile terminal is shown therein. The dashed line 806a shown in FIG. 8 illustrates the most direct route between the present location 802 and the target destination 804. Also shown in FIG. 8 are potential problem zones 808a, 808b that are between the present location 802 of the mobile terminal and the target destination 804 for the mobile terminal. The potential problem zones 808a, 808b can be referred to individual as a potential problem zone 808, or collectively as potential problem zones 808. One or more of the potential problem zones 808 can be, for example, a communication dead-zone that if travelled though would cause a mobile terminal to drop or otherwise lose its communication capabilities. Alternatively, one or more of the potential problem zones 808 can be a region where it has been reported that there exists interference that may cause a mobile terminal to drop or otherwise lose its communication capabilities, wherein such a potential problem zone 808 can also be referred to as an interference-zone. Such interference could have been reported by other mobile terminals of the communication system, or by interference information source(s) external to the communication system, examples of which were described above. The potential problem zone(s) 808 can alternatively be a region where wireless communication traffic exceeds a specified threshold, and therefore, if a mobile terminal travelled though that zone the mobile terminal more drop or otherwise lose its communication capability because a wireless communication system's capacity has already been reached within that zone. It is also possible that potential problem zone(s) 808 can be a region where rain fade or other weather related interference has been detected.

Potential problem zones, as the term is used herein, refers to zones that if travelled through or located within may cause a mobile terminal to lose a specific type of communication capability, and thus can be more descriptively referred to as potential communication problem zones. Potential problem zones are different than military threat zones, e.g., which are regions that are susceptible to unfriendly military threats, such as, but not limited to, anti-aircrafts guns or missiles that are a threat to aircraft, land mines that are a threat to ground vehicles, or sea mines that are a threat to boats and ships. In accordance with alternative embodiments, information about military threat zones can also be obtained, and such information can also be used when selecting a preferred navigational route. For example, if there are two potential navigational routes that avoid potential problem zones, but only one of the two potential navigational routes avoids military threat zones, then that route may be the one selected. In other words, information about military threat zones can be used to assist in selecting which of a plurality of possible navigational routes is selected for actual use.

Potential problem zones and military threat zones are different than non-military threat or hazard zones, e.g., which are regions or locations that are susceptible to threats, such as high crime areas, or temporary hazards, such as cranes within a drone route. In accordance with alternative embodiments, information about non-military threat or hazard zones can also be obtained, and such information can also be used when selecting a preferred navigational route.

Figure 9:
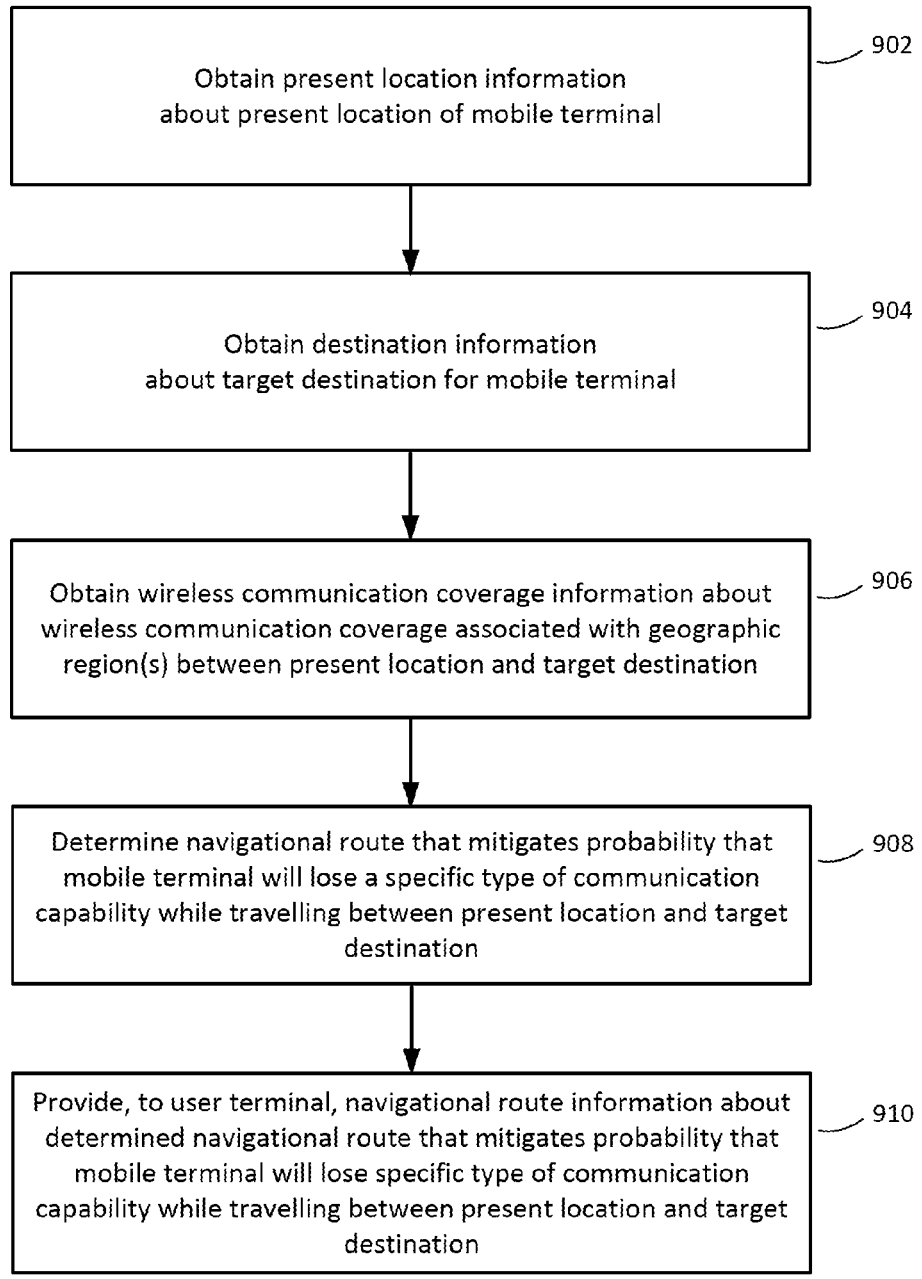
FIG. 9 is a high level flow diagram that is used to summarize certain embodiments of the present technology that can be used to direct a mobile satellite terminal from a present location to a target location, examples of which are shown in FIG. 8.

The high level flow diagram of FIG. 9 will now be used to summarize certain embodiments of the present technology that can be used to direct a mobile terminal from a present location (e.g., 802 in FIG. 8) to a target location (e.g., 804 in FIG. 8). Referring to FIG. 9, step 902 involves determining present location information about a present location (e.g., 802) of a mobile terminal. The present location is the current location of a mobile terminal that is being used to get to a target destination that differs from the present location. The present location information can be, for example, a street address, and/or longitudinal and latitudinal coordinates. The present location information can also include elevation information, which is especially useful where the mobile terminal is part of or within an aircraft. These are just a few examples of the types of information that can be included in the present location information, which examples are not meant to be all encompassing. The present location and the information indicative thereof can be entered by a user of a mobile terminal, or determined using GPS and/or other location signals.

Still referring to FIG. 9, step 904 involves obtaining destination information about a target destination for a mobile terminal. The target destination can be a waypoint destination or a final destination for the mobile terminal. The target destination, and/or information indicate thereof, can be entered by a user that is carrying the mobile terminal or is otherwise travelling with the mobile terminal. Alternatively, where the mobile terminal is a navigational subsystem of an autonomous vehicle, the target destination can be specified by a person or a computer that is remotely located relative to the mobile terminal. The destination information can include, for example, a street address, longitudinal and latitudinal coordinates and/or elevation information, but is not limited thereto. In certain embodiments the target destination may be moving, e.g., where there is a desire for the mobile device to navigate to another mobile device that is moving, e.g., so that users of two mobile devices can meet up.

Still referring to FIG. 9, step 906 involves obtaining wireless communication coverage information about wireless communication coverage associated with one or more geographic regions between the present location of the mobile terminal and the target destination for the mobile terminal. The wireless communication coverage information can include information about interference that may adversely affect wireless communication within one or more geographic regions between the present location of the mobile terminal and the target destination for the mobile terminal. Additionally, or alternatively, the wireless communication coverage information can include information about one or more dead-zones that may adversely affect wireless communication within one or more geographic regions between the present location of the mobile terminal and the target destination for the mobile terminal. Additionally, or alternatively, the wireless communication coverage information can include information about rain fade or other weather related interference that may adversely affect wireless communication within one or more geographic regions between the present location of the mobile terminal and the target destination for the mobile terminal. More specifically, in accordance with certain embodiments, step 906 includes identifying one or more potential problem zones between the present location of the mobile terminal and the target destination for the mobile terminal. As noted above, potential problem zones can be dead zones, interference zones, rain fade zones, zones where a level of signal degradation exceeds a corresponding threshold level, zones where a level of communication traffic exceeds a corresponding threshold level, or any combination thereof, but are not limited thereto.

Step 908 involves determining, in dependence on the wireless communication coverage information, a navigational route for the mobile terminal that mitigates a probability that the mobile terminal will lose a specific type of communication capability while travelling between the present location of the mobile terminal and the target destination for the mobile terminal. The specific type of communication capability can be a GPS navigation capability. In other words, the navigational route determined at step 908 can be one that mitigates a probability that the mobile terminal will lose its GPS navigational capability while travelling between its present location and target destination. Alternatively, the specific type of communication capability can be a voice capability or other type of multi-media capability. For example, where the mobile terminal is a mobile phone, the navigational route determined at step 908 can be one that mitigates a probability that the mobile terminal will lose its capability to support telephone calls while travelling between its present location and target destination.

Step 910 involves providing, to the mobile terminal (or to a person or computer remote from the mobile terminal that is controlling the mobile terminal or vehicle in which it is located), navigational route information about the determined navigational route for the mobile terminal that mitigates the probability that the mobile terminal will lose the specific type of communication capability while travelling between the present location of the mobile terminal and the target destination for the mobile terminal. For example, step 910 can involve transmitting navigational route information from a remote server to a mobile terminal (or to a person or computer remote from the mobile terminal that is controlling the mobile terminal or vehicle in which it is located). Step 910 need only be performed where step 908 is performed at a location that is remote from the mobile terminal 908. In other words, if the mobile terminal is itself responsible for performing step 908, then step 910 is not necessary.

Figure 10:
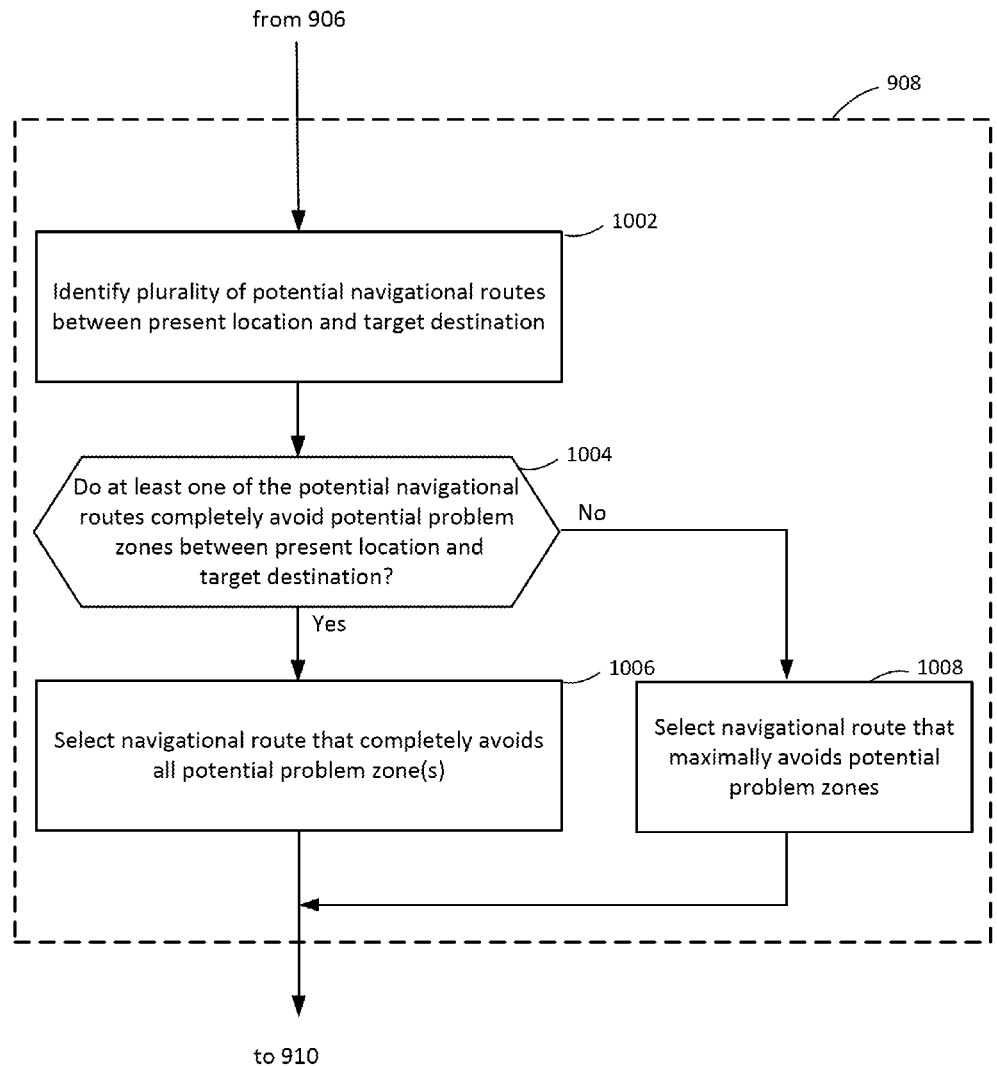
FIG. 10 is a high level flow diagram that is used to provide additional details of one of the steps introduced in FIG. 9, according to an embodiment.

Additional details of step 908, according to an embodiment, will now be described with reference to the high level flow diagram of FIG. 10, as well as reference back to FIG. 8. In other words, FIG. 10 is used to describe techniques for determining a navigational route, for a mobile terminal, that mitigates the probability that the mobile terminal will lose a specific type of communication capability while travelling between the present location of the mobile terminal and the target destination for the mobile terminal. Referring to FIG. 10, step 1002 involves identifying a plurality of potential navigational routes between the present location of the mobile terminal and the target destination for the mobile terminal. For example, as is known in the art, software can utilize one or more algorithms, map data, and the like, to determine possible routes based on predetermined criteria. For a more specific example, potential navigational routes can be identified by taking into account existing, predicted and dynamically and/or wirelessly received traffic and road information, historical information about road speeds, and/or a driver's preferences for the factors determining road choice (for example a driver may specify that a route should not include highways or toll roads). Referring briefly back to FIG. 8, the lines labeled 806*a*, 806*b* and 806*c* are examples of potential navigational routes between a present location 802 and a target destination 804.

Referring again to FIG. 10, at step 1004 there is a determination whether at least one of the plurality of potential navigational routes identified (e.g., determined) at step 1002 completely avoids all of the potential problem zone(s) between the present location of the mobile terminal and the target destination for the mobile terminal. If the answer to the determination at step 1004 is yes, then at step 1006 there is a selection of one of the plurality of potential navigational routes that completely avoids potential problem zones. If only one of the routes completely avoids the potential problem zones, e.g., as in the example shown in FIG. 8, then that route is selected at step 1006. If more than one of the routes completely avoids the potential problem zones, then one of those routes is selected at step 1006. Various selection criteria can be used to select among multiple potential routes that completely avoid the potential problem zones. Such selection criteria can be predetermined, or a user can be provided with multiple route options to select among. Examples of selection criteria include, but are not limited to, shortest distance route or shortest time route. Where the navigational route is being determined for a ground based vehicle that travels on roads (as opposed to an aircraft), selection criteria can relate to whether there is a preference to travel on highways, or avoid highways, and the like. In accordance with an embodiment, if more than one of the routes completely avoids the potential problem zones, then a user can be presented with a list of the possible routes (that completely avoids the potential problem zones) and a selection of one of such routes can be made by the user.

If none of the routes completely avoids the potential problem zones, then at step 1008 one of the navigational routes that maximally avoids the potential problem zones is selected. For example, assume that three potential navigational routes were identified at step 1004. Also assume that two of the routes each pass through two potential problem zones, while another route passes through only one potential problem zone. In this example, the route that passes through only one of the potential problem zones may be selected. The size of the potential problem zone(s) and/or the types and/or characteristics of the potential problem zone(s) may also be taken into account. For example, it may be better to select a navigational route that passes through two relatively small potential problem zones than it is to select a navigational route that passes through one potential problem zone that is significantly larger than the two relative small potential problem zones combined. For another example, it may be better to select a navigational route that passes through a rain fade zone than through a communication dead zone, because a mobile terminal (and the communication system of which it is a part) is more likely to be able to successfully compensate for rain fade than for a communication dead zone. More generally, one or more algorithms can be used to determine which one of the plurality of potential navigational routes, if followed, has a lowest probability that the mobile terminal will lose a specific type of communication capability. If it is likely that the mobile terminal will lose the specific type of communication capability for at least some period of time, regardless which route is followed, then the navigational route that would most likely lose the specific type of communication capability for the least amount of time may be selected. Other variations are also possible, and are within the scope of embodiments of the present technology. For example, a user may be provided with a list of possible routes, along with information, for each of the possible routes, about the probability that a communication capability will be lost if that route is followed. A user may then be given the option to select among the various possible routes.

Rather than identifying a plurality of potential navigational routes between the present location and the target destination at step 1002, and then selecting from among those potential routes at steps 1004, 1006 and 1008, there can initially be a determination of whether any navigational routes that completely avoids all potential problem zones exists, and if one or more of such routes exist, one such route can be selected. In other words, the known existence of one or more potential problems zones can be used to initially identify potential navigational routes between the present location of a mobile terminal and its target destination. In such an alternative embodiment, if a navigational route that completely avoids all potential problem zones does not exist, then in a similar manner as was described above, a navigational routes that maximally avoids the potential problem zone(s) can be identified and selected.

In accordance with certain embodiments, an interference zone is only considered a potential problem zone for a particular wireless communication system, and mobile terminals thereof, if the interference associated with the interference zone has characteristics that are likely to adversely affect wireless communications of mobile terminals (of the particular wireless communication system) if they are within the interference zone. For example, if the frequency range of the interference associated with an interference zone is well outside the particular frequency range(s) used by the particular wireless communication system, then mobile terminals passing through such an interference zone would likely be unaffected by the interference, and thus, that interference zone would not be considered a potential problem zone for that particular wireless communication system.

In accordance with an embodiment, the steps described with reference to FIG. 9 are performed by a mobile terminal, which may or may not be a mobile satellite terminal, exemplary components of which were described above with reference to FIG. 1C. In accordance with another embodiment, the steps described with reference to FIG. 9 are performed by a subsystem of a wireless communication system that is remotely located relative to a mobile terminal for which the steps are being performed. For example, the steps described with reference to FIG. 9 can be performed by a controller within a gateway type of satellite terminal, a controller within the mobile terminal and/or a central controller that wirelessly communicates with mobile terminals utilizing one or more satellite(s) and/or terrestrial tower(s) of a wireless communication system. In still other embodiments, some of the steps described with reference to FIG. 9 are performed by a mobile terminal while other steps are performed by one or more other subsystem(s) of the wireless communication system. For example, steps 902 and 904 can be performed by a mobile terminal, and steps 906, 908 and 910 can be obtained by one or more other subsystem(s) remotely located relative to the mobile terminal. For another example, steps 902 and 904 can be performed by a mobile terminal, step 906 can be performed by other subsystem remotely located relatively to the mobile terminal. The wireless coverage information obtained at step 906 can be wirelessly provided from the other subsystem to the mobile terminal, e.g., between steps 906 and 908, and then step 908 can be performed by the mobile terminal, in which case step 910 is unnecessary. Other variations are also possible and within the scope of embodiments of the present technology.

As mentioned above, a target destination for a mobile terminal can be a waypoint or a final destination. Specific waypoints can be specified by a user of a mobile terminal, e.g., where the user wants to temporarily visit certain locations on their way to their final destination. Alternatively, or additionally, one or more waypoints can be specified by a subsystem of a wireless communication system. For example, there may be a subsystem of a wireless communication system that maps out routes flown by drones that carry a communication payload, and such a subsystem may specify waypoints for the drones. In accordance with certain embodiments, one of the aspects of determining a navigational route at step 908 may involve moving and/or adding one or more waypoints. This can be useful where travelling a most direct route between a present location and a target destination would cause a mobile terminal to travel through one or more potential problem zones.

In accordance with certain embodiments, a subsystem that determines a navigational route at step 908 takes into account the remaining fuel of a vehicle in which a mobile terminal is located and/or whether there are practical opportunities for the vehicle to refuel on its way to its final destination. For example, where a mobile terminal is a navigational subsystem of a drone, it may be that the drone has only enough remaining fuel to follow one of a plurality of potential routes between a present location and target destination that avoids potential problem zones. In such an example, information about the drone's remaining fuel can be used to select from among the plurality of potential routes.

Certain embodiments described herein relate to a method for use with a satellite communication system that includes a plurality of satellites and a plurality of satellite terminals, wherein each of the satellite terminals is configured to communicate with at least one of the other satellite terminals utilizing at least one of the satellites. The method includes obtaining interference information from one or more interference information sources external to the satellite communication system, wherein the interference information is indicative of non-weather related interference that can adversely affect efficacy of the satellite communication system. The method also includes dynamically adapting configurable link parameters of the satellite communication system and/or dynamically allocating resources of the satellite communication system based on the interference information obtained from the one or more interference information sources that is/are external to the satellite communication system. In certain embodiments, the dynamically adapting configurable link parameters and/or the dynamically allocating resources of the satellite communication system, based on the interference information obtained from one or more interference information sources external to the satellite communication system, is performed proactively to prevent or mitigate adverse effects of non-weather related interference on the efficacy of the satellite communication system. One or more instances of the interference information can include information about a geographic location and/or region associated with non-weather related interference. Additionally, or alternatively, one or more instances of the interference information can include information about one or more of spectral, temporal, spatial, power density, or code characteristics associated with non-weather related interference. Additionally, or alternatively, one or more instances of the interference information includes information indicative of changes in a geographic location and/or region associated with non-weather related interference. In certain embodiments, the method includes monitoring locations of one or more of the satellite terminals of the satellite communication system, and the dynamically adapting configurable link parameters and/or the dynamically allocating resources of the satellite communication system is also based on the monitored locations of one or more of the satellite terminals of the satellite communication system. The monitoring locations of one or more of the satellite terminals of the satellite communication system can include monitoring changes in the locations, in which case the dynamically adapting configurable link parameters and/or the dynamically allocating resources of the satellite communication system can also be based on the changes in the monitored locations of one or more of the satellite terminals of the satellite communication system.

Interference information is a type of situational awareness information. Certain embodiments involve obtaining one or more other types of situational awareness information from one or more sources external to the satellite communication system. Such embodiments can also include dynamically adapting configurable link parameters of the satellite communication system and/or dynamically allocating resources of the satellite communication system also based on at least one of the one or more other types of situational awareness information obtained from the one or more sources that is/are external to the satellite communication system.

Interference information and one or more other types situational awareness information can also be obtained from one or more sub-systems of the satellite communication system. In such embodiments, the dynamically adapting configurable link parameters and/or dynamically allocating resources of the satellite communication system can also be based on the interference information and at least one of the one or more other types of situational awareness information obtained from the one or more subsystems of the satellite communication system.

Certain embodiments described herein relate to a satellite communication system comprising a plurality of satellites and a plurality of satellite terminals each of which is configured to communicate with at least one of the other satellite terminals utilizing at least one of the satellites. The satellite communication system can also include one or more network interfaces adapted to obtain interference information from one or more interference information sources external to the satellite communication system, wherein the interference information is indicative of non-weather related interference that can adversely affect efficacy of the satellite communication system. The satellite communication system can also include one or more controllers adapted to dynamically adapt configurable link parameters and/or dynamically allocate resources of the satellite communication system based on the interference information and/or other types of situational awareness information obtained from the one or more interference information sources that is/are external to the satellite communication system. Instances of the interference information can include information about a geographic location and/or region associated with non-weather related interference, and/or one or more of spectral, temporal, spatial, power density, or code characteristics associated with non-weather related interference. The one or more controllers can also be adapted to dynamically adapt configurable link parameters of the satellite communication system and/or dynamically allocate resources of the satellite communication system also based on the interference information and/or one or more other types of the situational awareness information obtained from the one or more subsystems of the satellite communication system.

Certain embodiments described herein are directed to a subsystem of a communication system, wherein the subsystem includes one or more network interfaces adapted to obtain interference information from one or more interference information sources external to the communication system, wherein the interference information is indicative of non-weather related interference that can adversely affect efficacy of the communication system. Additionally, the subsystem includes a controller adapted to dynamically adapt configurable link parameters and/or dynamically allocate resources of the communication system based on the interference information obtained from the one or more interference information sources that is/are external to the communication system. For example, the controller can be adapted to modify at least one of a frequency, a code, a polarization or a time slot used by a further subsystem of the communication system to proactively prevent or mitigate adverse effects of non-weather related interference on the efficacy of the communication system. The communication system can comprise a satellite communication system. The communication system can include both satellite and non-satellite communication capabilities. It is also possible that the communication system be a ground-based wireless communication system that comprises non-satellite communication capabilities.

Certain embodiments described herein are directed to a method for use when directing a mobile terminal from a present location to a target location. The method includes obtaining present location information about a present location of a mobile terminal and obtaining destination information about a target destination for the mobile terminal, wherein the target destination can be a waypoint destination or a final destination for the mobile terminal. The method also includes obtaining wireless communication coverage information about wireless communication coverage associated with one or more geographic regions between the present location of the mobile terminal and the target destination for the mobile terminal. Additionally, the method includes determining a navigational route for the mobile terminal that mitigates a probability that the mobile terminal will lose a specific type of communication capability while travelling between the present location of the mobile terminal and the target destination for the mobile terminal. In certain embodiments, the obtained wireless communication coverage information includes information about one or more of the following types of potential problems zones: a dead zone; a non-weather related interference zone; a weather-related interference zone; a line of sight blockage zone; a multipath zone; a zone where a level of signal degradation exceeds a corresponding threshold level; or a zone where a level of communication traffic exceeds a corresponding threshold level. The mobile terminal can be, e.g., a mobile telephone, a mobile multimedia device, a navigational subsystem of a pedestrian handheld device, a vehicle or of a device within a vehicle. For a more specific example, the mobile terminal comprises a navigational subsystem of an autonomous or semi-autonomous vehicle.

Certain embodiments are directed to a navigational subsystem including a communication interface and one or more processors. The communication interface obtains wireless communication coverage information about wireless communication coverage between a present location of a mobile terminal and a target destination for the mobile terminal. The one or more processors that determine a navigational route for the mobile terminal that mitigates a probability that the mobile terminal will lose a specific type of communication capability while travelling between the present location of the mobile terminal and the target destination for the mobile terminal. The navigational subsystem can be, or be part of, the mobile terminal. The navigational subsystem can alternatively be remotely located relative to the mobile terminal, and the communication interface, or a further communication interface of the navigational subsystem, provides to the mobile terminal (or to a controller that is remote from the mobile terminal) with navigational route information about the determined navigational route for the mobile terminal that mitigates the probability that the mobile terminal will lose the specific type of communication capability while travelling between the present location of the mobile terminal and the target destination for the mobile terminal. The wireless communication coverage information can include information about potential problems zones, examples of which were provided above. Additionally, the communication interface can also obtain information about one or more military threat zones between the present location of the mobile terminal and the target destination for the mobile terminal, and the one or more processors also use information about the one or more military threat zones to select the navigational route between the present location of the mobile terminal and the target destination for the mobile terminal. The communication interface can also obtains information about one or more physical hazards between the present location of the mobile terminal and the target destination for the mobile terminal, and the one or more processors also use information about the one or more physical hazards to select the navigational route between the present location of the mobile terminal and the target destination for the mobile terminal.

Certain embodiments described above involve identifying one or more potential problem zones between a present location of a mobile terminal and a target destination for the mobile terminal, wherein each of the potential problem zones is one of a dead zone, a non-weather related interference zone, a weather-related interference zone, a line of sight blockage zone, a multipath zone, a zone where a level of signal degradation exceeds a corresponding threshold level, or a zone where a level of communication traffic exceeds a corresponding threshold level. Such embodiments also involve using information about the identified one or more potential problem zones to select a navigational route between the present location of the mobile terminal and the target destination for the mobile terminal. More specifically, the information about the identified one or more potential problem zones can be used to select a navigational route that mitigates a probability that the mobile terminal will lose a specific type of communication capability while travelling between the present location of the mobile terminal and the target destination for the mobile terminal. Note that for purposes of this document a connection can be a direct or indirect connection. Similarly, two components are in communication if they are directly connected or if they can communicate via one or more other components. Although the drawings show the steps in a particular order, that order is not required unless the discussion says it is or there is a technical reason requiring the order.

The foregoing detailed description has been presented for purposes of illustration and description. It is not intended to be exhaustive or to limit the subject matter claimed herein to the precise form(s) disclosed. Many modifications and variations are possible in light of the above teachings. The described embodiments were chosen in order to best explain the principles of the disclosed technology and its practical application to thereby enable others skilled in the art to best utilize the technology in various embodiments and with various modifications as are suited to the particular use contemplated. It is intended that the scope be defined by the claims appended hereto.

What is claimed is:

1. A method for use when directing a mobile satellite terminal from a present location to a target location, the method comprising:
   (a) obtaining present location information about a present location of a mobile satellite terminal, wherein the mobile satellite terminal comprises a navigational subsystem of an autonomous or semi-autonomous mobile ground-based, marine, airborne, or spaceborne vehicle, and wherein the mobile satellite terminal is configured to wirelessly communicate with one or more satellites;
   (b) obtaining destination information about a target destination for the mobile satellite terminal, wherein the target destination can be a waypoint destination or a final destination for the mobile satellite terminal;
   (c) obtaining wireless satellite communication coverage information about wireless satellite communication coverage associated with one or more geographic regions between the present location of the mobile satellite terminal and the target destination for the mobile satellite terminal; and
   (d) determining, in dependence on the wireless satellite communication coverage information, a navigational route for the mobile satellite terminal that mitigates a probability that the mobile satellite terminal will lose a specific type of communication capability while travelling between the present location of the mobile satellite terminal and the target destination for the mobile satellite terminal,
      wherein the specific type of communication capability comprises a navigational capability, which if lost, would prevent the mobile satellite terminal from at least one of determining or receiving navigational route information used to navigate the mobile satellite terminal from the present location of the mobile satellite terminal to the target destination for the mobile satellite terminal.

2. The method of claim 1, wherein steps (a), (b), (c) and (d) are performed by the mobile satellite terminal.

3. The method of claim 1, wherein step (d) is determined by a subsystem that is remotely located relative to the mobile satellite terminal, and further comprising:
   (e) providing, to the mobile satellite terminal or a controller in communication with the mobile satellite terminal, navigational route information about the determined navigational route for the mobile satellite terminal that mitigates the probability that the mobile satellite terminal will lose the specific type of communication capability while travelling between the present location of the mobile satellite terminal and the target destination for the mobile satellite terminal.

4. The method of claim 1, wherein the specific type of communication capability comprises a global positioning system (GPS) navigation capability.

5. The method of claim 1, wherein the wireless satellite communication coverage information obtained at step (c) comprises information about non-weather related interference that may adversely affect wireless satellite communication within one or more geographic regions between the present location of the mobile satellite terminal and the target destination for the mobile satellite terminal.

6. The method of claim 1, wherein the wireless satellite communication coverage information obtained at step (c) comprises information about one or more satellite communication dead zones that may adversely affect wireless satellite communication within one or more geographic regions between the present location of the mobile satellite terminal and the target destination for the mobile satellite terminal.

7. The method of claim 1, wherein the wireless satellite communication coverage information obtained at step (c) comprises information about weather related interference that may adversely affect wireless communication coverage within one or more geographic regions between the present location of the mobile satellite terminal and the target destination for the mobile satellite terminal.

8. The method of claim 1, wherein:
the obtaining wireless satellite communication coverage information at step (c) comprises identifying one or more potential problem zones between the present location of the mobile satellite terminal and the target destination for the mobile satellite terminal; and
the determining the navigational route for the mobile satellite terminal at step (d), that mitigates the probability that the mobile satellite terminal will lose the specific type of communication capability while travelling between the present location of the mobile satellite terminal and the target destination for the mobile satellite terminal, comprises:
(d.i) identifying a plurality of potential navigational routes between the present location of the mobile satellite terminal and the target destination for the mobile satellite terminal;
(d.ii) selecting, from the plurality of potential navigational routes, one of the potential navigational routes that completely avoids the one or more potential problem zones, if at least one of the plurality of potential navigational routes completely avoids the one or more potential problem zones; and
(d.iii) selecting, from the plurality of potential navigational routes, one of the potential navigational routes that maximally avoids the one or more potential problem zones, if none of the plurality of potential navigational routes completely avoids the one or more potential problem zones.

9. The method of claim 1, wherein:
the obtaining wireless satellite communication coverage information at step (c) comprises identifying one or more potential problem zones between the present location of the mobile satellite terminal and the target destination for the mobile satellite terminal; and
the determining the navigational route for the mobile satellite terminal at step (d), that mitigates the probability that the mobile satellite terminal will lose the specific type of communication capability while travelling between the present location of the mobile satellite terminal and the target destination for the mobile satellite terminal, comprises:
(d.i) identifying a navigational route that completely avoids the one or more potential problem zones, if a navigational routes that completely avoids the one or more potential problem zones exists; and
(d.ii) identifying a navigational route that maximally avoids the one or more potential problem zones, if a navigational routes that completely avoids the one or more potential problem zones does not exist.

10. The method of claim 9, wherein the potential problems zones includes one or more of the following:
a dead zone;
a non-weather related interference zone;
a weather-related interference zone;
a line of sight blockage zone;
a multipath zone;
a zone where a level of signal degradation exceeds a corresponding threshold level; or
a zone where a level of communication traffic exceeds a corresponding threshold level.

11. The method of 1, further comprising:
obtaining information about one or more military threat zones between the present location of the mobile satellite terminal and the target destination for the mobile satellite terminal; and
wherein step (b) also includes using information about the one or more military threat zones to select the navigational route between the present location of the mobile satellite terminal and the target destination for the mobile satellite terminal.

12. The method of 1, further comprising:
obtaining information about one or more physical hazards between the present location of the mobile satellite terminal and the target destination for the mobile satellite terminal; and
wherein step (b) also includes using information about the one or more physical hazards to select the navigational route between the present location of the mobile satellite terminal and the target destination for the mobile satellite terminal.

13. A navigational subsystem for use in navigating an autonomous or semi-autonomous mobile ground-based, marine, airborne, or spaceborne vehicle, the navigational subsystem comprising:
a communication interface that obtains wireless communication coverage information about wireless communication coverage between a present location of a mobile satellite terminal and a target destination for the mobile satellite terminal; and
one or more processors that determine, in dependence on the wireless satellite communication coverage information, a navigational route for the mobile satellite terminal that mitigates a probability that the mobile satellite terminal will lose a specific type of communication capability while travelling between the present location of the mobile satellite terminal and the target destination for the mobile satellite terminal,
wherein the specific type of communication capability comprises a navigational capability, which if lost, would prevent the mobile satellite terminal from at least one of determining or receiving navigational route information used to navigate the mobile satellite terminal from the present location of the mobile satellite terminal to the target destination for the mobile satellite terminal.

14. The navigational subsystem of claim 13, wherein navigational subsystem is, or is part of, the mobile satellite terminal.

15. The navigational subsystem of claim 13, wherein:
the navigational subsystem is remotely located relative to the mobile satellite terminal; and
the communication interface, or a further communication interface of the navigational subsystem, provides to the mobile satellite terminal or to a controller that is remote from the mobile satellite terminal, navigational route information about the determined navigational route for the mobile satellite terminal that mitigates the probability that the mobile satellite terminal will lose the specific type of communication capability while travelling between the present location of the mobile satellite terminal and the target destination for the mobile satellite terminal.

16. The navigational subsystem of claim 13, wherein the wireless communication coverage information includes information about one or more of the following types of potential problems zones:
a dead zone;
a non-weather related interference zone;
a weather-related interference zone;
a line of sight blockage zone;
a multipath zone;

a zone where a level of signal degradation exceeds a corresponding threshold level; or a zone where a level of communication traffic exceeds a corresponding threshold level.

17. The navigation subsystem of 19, wherein:

the communication interface also obtains information about one or more military threat zones between the present location of the mobile satellite terminal and the target destination for the mobile satellite terminal; and the one or more processors also use information about the one or more military threat zones to select the navigational route between the present location of the mobile satellite terminal and the target destination for the mobile satellite terminal.

18. The navigation subsystem of 19, wherein:

the communication interface also obtains information about one or more physical hazards between the present location of the mobile satellite terminal and the target destination for the mobile satellite terminal; and the one or more processors also use information about the one or more physical hazards to select the navigational route between the present location of the mobile satellite terminal and the target destination for the mobile satellite terminal.

19. A method for use when directing a mobile satellite terminal from a present location to a target location, the method comprising:

(a) identifying one or more potential problem zones between a present location of a mobile satellite terminal and a target destination for the mobile satellite terminal, wherein each of the potential problem zones is one of a dead zone, a non-weather related interference zone, a weather-related interference zone, a line of sight blockage zone, a multipath zone, a zone where a level of signal degradation exceeds a corresponding threshold level, or a zone where a level of communication traffic exceeds a corresponding threshold level; and (b) using information about the identified one or more potential problem zones to select a navigational route between the present location of the mobile satellite terminal and the target destination for the mobile satellite terminal that mitigates a probability that the mobile satellite terminal will lose a global positioning system (GPS) navigation capability while travelling between the present location of the mobile satellite terminal and the target destination for the mobile satellite terminal, wherein the mobile satellite terminal comprises a navigational subsystem of an autonomous or semi-autonomous mobile ground-based, marine, airborne, or spaceborne vehicle, and wherein the mobile satellite terminal is configured to wirelessly communicate with one or more satellites.

20. The method of claim 19, wherein step (b) comprises using information about the identified one or more potential problem zones to select a navigational route that avoids the one or more potential problem zones.

21. The method of claim 19, further comprising:

identifying one or more military threat zones between the present location of the mobile satellite terminal and the target destination for the mobile satellite terminal; and wherein step (b) also includes using information about the identified one or more military threat zones to select the navigational route between the present location of the mobile satellite terminal and the target destination for the mobile satellite terminal.

22. The method of claim 19, further comprising:

identifying one or more physical hazards between the present location of the mobile satellite terminal and the target destination for the mobile satellite terminal; and wherein step (b) also includes using information about the identified one or more physical hazards to select the navigational route between the present location of the mobile satellite terminal and the target destination for the mobile satellite terminal.

* * * * *